(12) United States Patent
Sato

(10) Patent No.: US 9,806,996 B2
(45) Date of Patent: Oct. 31, 2017

(54) INFORMATION PROCESSING SYSTEM AND CONTROL METHOD FOR INFORMATION PROCESSING SYSTEM

(71) Applicant: FUJITSU LIMITED, Kawasaki-shi, Kanagawa (JP)

(72) Inventor: Masahiro Sato, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 289 days.

(21) Appl. No.: 14/667,734

(22) Filed: Mar. 25, 2015

(65) Prior Publication Data

US 2015/0312141 A1    Oct. 29, 2015

(30) Foreign Application Priority Data

Apr. 28, 2014    (JP) ................. 2014-092693

(51) Int. Cl.
  *H04L 12/26*  (2006.01)
  *H04L 12/703*  (2013.01)
  *H04L 12/24*  (2006.01)

(52) U.S. Cl.
  CPC .......... *H04L 45/28* (2013.01); *H04L 41/0677* (2013.01)

(58) Field of Classification Search
  CPC ..................................... H04L 45/28
  USPC ......................................... 370/225
  See application file for complete search history.

(56) References Cited

U.S. PATENT DOCUMENTS

| | | |
|---|---|---|
| 2008/0170494 A1 | 7/2008 | Enoki et al. |
| 2009/0225663 A1 | 9/2009 | Kaiduka |
| 2011/0299537 A1* | 12/2011 | Saraiya ............... H04L 61/2596 370/392 |
| 2013/0103817 A1* | 4/2013 | Koponen ............ G06F 9/45558 709/223 |
| 2014/0108854 A1* | 4/2014 | Antony ................. G06F 11/203 714/4.2 |
| 2014/0351545 A1* | 11/2014 | Nakajima ............ G06F 3/0607 711/170 |
| 2015/0026345 A1* | 1/2015 | Ravinoothala ........ H04L 47/125 709/226 |
| 2015/0103838 A1* | 4/2015 | Zhang .................... H04L 45/04 370/401 |

FOREIGN PATENT DOCUMENTS

| | | |
|---|---|---|
| JP | 2008-172636 | 7/2008 |
| JP | 2009-212984 | 9/2009 |
| JP | 2010-088031 | 4/2010 |

* cited by examiner

*Primary Examiner* — Christopher R Crompton
(74) *Attorney, Agent, or Firm* — Fujitsu Patent Center

(57) ABSTRACT

An effect range identifying unit identifies servers that were in communication. Then, the effect range identifying unit identifies virtual machines that were in communication in the identified servers. However, the effect range identifying unit excludes the virtual machine in which the time elapsed after the occurrence of the failure is greater than the aging time from the virtual machines that were in communication. Furthermore, the effect range identifying unit refers to the ARP management table and excludes the virtual machine in which the failure occurrence time is not greater than the transmission time from the virtual machines that are in communication. Then, the effect range identifying unit refers to VM allocation information and tunnel path information and identifies a tenant and a communication path that are affected by the failure.

7 Claims, 35 Drawing Sheets

| ADDRESS | VLAN NUMBER | OUTPUT DESTINATION |
|---|---|---|
| SERVER$_2$ | - | P$_1$ |
| SERVER$_1$ | - | P$_2$ |
| ⋮ | ⋮ | ⋮ |

FIG.5

| ADDRESS | VLAN NUMBER | OUTPUT DESTINATION | AGING TIME |
|---------|-------------|--------------------|-----------| 
| $VM_3$ | 1 | $P_1$ | 10 |
| $VM_1$ | 1 | $P_2$ | 15 |
| ⋮ | ⋮ | ⋮ | ⋮ |

FIG.6

| TENANT NAME | VM NAME | SERVER NAME |
|-------------|---------|-------------|
| A | $VM_1$ $VM_3$ | $SERVER_1$ $SERVER_2$ |
| B | $VM_2$ $VM_4$ | $SERVER_1$ $SERVER_2$ |
| ⋮ | ⋮ | ⋮ |

FIG.7

| COMMUNICATION PAIR | TUNNEL ID | PATH |
|--------------------|-----------|------|
| $SERVER_1$-$SERVER_3$ | 1 | $LINK_1$, $LINK_3$, $LINK_7$ |
| $SERVER_1$-$SERVER_2$ | 2 | $LINK_1$, $LINK_3$, $LINK_5$, $LINK_2$ |
| ⋮ | ⋮ | ⋮ |

FIG.31

```
·SWITCH₁
  ·0B (SERVER₂)
·SWITCH₃
  ·0A (SERVER₁)
```

FDB (SWITCH₁)

| ADDRESS | VLAN NUMBER | OUTPUT DESTINATION |
|---------|-------------|--------------------|
| 0A | - | P₃ |
| 0B | - | P₁ |
| 0D | - | P₂ |

FDB (SWITCH₃)

| ADDRESS | VLAN NUMBER | OUTPUT DESTINATION |
|---------|-------------|--------------------|
| 0A | - | P₁ |
| 0B | - | P₂ |

FIG.32

- CURRENT TIME (1:01:42) - FAILURE OCCURRENCE
  TIME (1:01:40)=2 SECONDS
  - v SWITCH$_1$
    - 0E (VM$_1$)
    - 0G (VM$_3$)
  - v SWITCH$_2$
    - 0E (VM$_1$)
    - 0G (VM$_3$)

FDB (v SWITCH$_1$)

| ADDRESS | VLAN NUMBER | OUTPUT DESTINATION | AGING TIME |
|---|---|---|---|
| 0E | 1 | P$_2$ | 0 |
| 0G | 1 | P$_1$ | 0 |
| 0F | 2 | P$_3$ | 10 |
| 0J | 2 | P$_1$ | 70 |

FDB (v SWITCH$_2$)

| ADDRESS | VLAN NUMBER | OUTPUT DESTINATION | AGING TIME |
|---|---|---|---|
| 0E | 1 | P$_1$ | 0 |
| 0G | 1 | P$_2$ | 0 |

FIG.33

- v SWITCH$_1$
  - 0E (VM$_1$)→1:01:40 (FAILURE OCCURRENCE TIME)
    >1:00:10 (TRANSMISSION TIME)
  - 0G (VM$_3$)→1:01:40 (FAILURE OCCURRENCE TIME)
    >1:00:20 (TRANSMISSION TIME)
- v SWITCH$_2$
  - 0E (VM$_1$)→1:01:40 (FAILURE OCCURRENCE TIME)
    >1:00:10 (TRANSMISSION TIME)
  - 0G (VM$_3$)→1:01:40 (FAILURE OCCURRENCE TIME)
    >1:00:20 (TRANSMISSION TIME)
- MAC ADDRESS (VIRTUAL MACHINE) IS EXTRACTED FOR EACH VIRTUAL SWITCH

ARP MANAGEMENT TABLE (SWITCH$_1$)

| HOST | TRANSMISSION TIME |
|---|---|
| 0E | 1:00:10 |
| 0F | 1:00:30 |

ARP MANAGEMENT TABLE (SWITCH$_2$)

| HOST | TRANSMISSION TIME |
|---|---|
| 0G | 1:00:20 |

FIG.34

BECAUSE TENANT BELONGING TO VM$_1$ AND VM$_3$ IS TENANT A, IT IS IDENTIFIED THAT TENANT A WAS IN COMMUNICATION

VM ALLOCATION INFORMATION

| TENANT | VM | SERVER |
|---|---|---|
| A | VM$_1$<br>VM$_3$<br>ROUTER$_1$ | SERVER$_1$<br>SERVER$_2$<br>SERVER$_3$ |
| B | VM$_2$<br>VM$_4$<br>ROUTER$_2$ | SERVER$_1$<br>SERVER$_2$<br>SERVER$_4$ |

FIG.35

- TUNNEL AND PASSING ROUTE TO BE USED WHEN COMMUNICATION IS PERFORMED BETWEEN $SERVER_1$ AND $SERVER_2$ ARE IDENTIFIED FROM TUNNEL PATH INFORMATION
- $TUNNEL_2$ IS SUBJECT TUNNEL AND THUS PASSING ROUTE IS AS FOLLOWS
  - $LINK_1$, $LINK_3$, $LINK_5$, $LINK_2$

TUNNEL PATH INFORMATION

| COMMUNICATION PAIR | TUNNEL | PATH |
|---|---|---|
| $SERVER_1$-$SERVER_3$ | 1 | $LINK_1$, $LINK_3$, $LINK_7$ |
| $SERVER_1$-$SERVER_2$ | 2 | $LINK_1$, $LINK_3$, $LINK_5$, $LINK_2$ |
| $SERVER_1$-$SERVER_4$ | 3 | $LINK_1$, $LINK_4$, $LINK_8$ |
| $SERVER_2$-$SERVER_4$ | 4 | $LINK_2$, $LINK_6$, $LINK_8$ |
| $SERVER_2$-$SERVER_3$ | 5 | $LINK_2$, $LINK_5$, $LINK_7$ |

- BECAUSE $LINK_3$ THAT IS FAILURE LINK IS INCLUDED IN $TUNNEL_2$ PATH, FAILURE OCCURS IN COMMUNICATION
  - AFFECTED TENANT CORRESPONDS TO TENANT A THAT HAD COMMUNICATED BETWEEN $SERVER_1$ AND $SERVER_2$

INFORMATION PROCESSING SYSTEM AND CONTROL METHOD FOR INFORMATION PROCESSING SYSTEM

CROSS-REFERENCE TO RELATED APPLICATION(S)

This application is based upon and claims the benefit of priority of the prior Japanese Patent Application No. 2014-092693, filed on Apr. 28, 2014, the entire contents of which are incorporated herein by reference.

FIELD

The embodiment discussed herein is directed to an information processing system and a control method for the information processing system.

BACKGROUND

In a cloud environment that provides computational resources for a plurality of tenants by using a plurality of information processing apparatuses that are connected via a network, when a failure occurs in the network, a tenant affected in communication is identified and informed.

FIG. 37 is a schematic diagram illustrating a method for identifying tenants in communication when a failure has occurred. In FIG. 37, a $server_1$ and a $server_2$ are information processing apparatuses and a $switch_1$ to a $switch_4$ are switches that relay packets. The $server_1$ and the $server_2$ are connected by a network that includes the $switch_1$ to the $switch_4$.

A $VM_1$, a $VM_2$, and a v $switch_1$ are running in the $server_1$, whereas a $VM_3$, a $VM_4$, and a v $switch_2$ are running in the $server_2$. Here, the $VM_1$ to the $VM_4$ are virtual machines to which the resources of the server are allocated to run, and the v $switch_1$ and the v $switch_2$ are virtual switches that are used when the virtual machines communicate with each other.

The $server_1$ is connected to the $switch_1$ via a port $P_2$. The port $P_1$ of the $switch_1$ is connected to a port $P_2$ of the $switch_3$. A tenant A uses the $VM_1$ and the $VM_3$ and the $VM_1$ communicates with the $VM_3$ by using a logical network, virtual local area network $(VLAN)_1$. A tenant B uses the $VM_2$ and the $VM_4$ and the $VM_2$ communicates with the $VM_4$ by using a logical network, $VLAN_2$. The $VLAN_1$ and the $VLAN_2$ share the network resources, such as the $switch_1$ to the $switch_4$; however, communication between the tenants is not permitted.

The $VM_1$ sends a packet to the $VM_3$ via the $switch_1$, the $switch_3$, and the $switch_2$, whereas the $VM_3$ sends a packet to the $VM_1$ via the $switch_2$, the $switch_3$, and the $switch_1$. The address of the $VM_3$ indicating the sending destination, the address of the $VM_1$ indicating the sending source, and the $VLAN_1$ number are attached to the packet that is sent to the $VM_3$ by the $VM_1$ by using the $VLAN_1$. The address of the $VM_1$ indicating the sending destination, the address of the $VM_3$ indicating the sending source, and the $VLAN_1$ number are attached to the packet that is sent to the $VM_1$ by the $VM_3$ by using the $VLAN_1$. Note that, in FIG. 37, the address of the $VM_1$ is simply represented by the "$VM_1$", the address of the $VM_3$ is simply represented by the "$VM_3$", and the $VLAN_1$ number is represented by the "$VLAN_1$" in the packet.

If a failure has occurred in a link that connects the port $P_1$ of the $switch_1$ to the port $P_2$ of the $switch_3$, the management device that manages the servers and the switches refers to forwarding databases (FDBs) held by the corresponding nodes at both ends of the link. In FIG. 37, the $switch_1$ and the $switch_3$ are the nodes at both ends of the link in which the failure has occurred. The FDB is a database that is used to identify, from the address of the sending destination of the packet, a port of the output destination of a packet and the FDB stores therein, in an associated manner, the address and the VLAN number. The address is the address of a virtual machine that corresponds to the sending destination of a packet. The output destination indicates the ID of the port that outputs the packet.

By using the FDBs of the nodes at both ends, the management device identifies the virtual machine that uses the port connected to the link in which the failure has occurred and then identifies the tenant that uses the identified virtual machine as the tenant that is affected by the failure. Specifically, the management device identifies, from the FDB stored in the $switch_3$, the $VM_1$ that uses the $P_2$ as the output destination and then identifies, from the FDB stored in the $switch_1$, the $VM_3$ that uses the $P_1$ as the output destination. Then, by using information in which a virtual machine is associated with a tenant, the management device identifies, as the tenant affected by the failure, the tenant A that uses the $VM_1$ and the $VM_3$. Furthermore, the management device identifies, as a failure path, the communication path that is used by the $VM_1$ and the $VM_3$.

There is a conventional technology, related to a failure of a network, that establishes a tunneling that is a virtual direct communication circuit for a detour in order to secure communication between a device connected to a network that is disconnected due to the failure and another network. Furthermore, there is a technology that identifies, if a failure occurs in a physical network that includes therein a plurality of nodes that relay various kinds of data, a service providing device that provides various services and that is connected to the nodes, and user devices that use these services, the title of the service that is affected by the failure. Furthermore, there is a conventional technology that detects a failure occurring in an underlay network on the basis of a change in a tunnel traffic in an overlay network that is constructed on an underlay network.

Patent Document 1: Japanese Laid-open Patent Publication No. 2008-172636

Patent Document 2: Japanese Laid-open Patent Publication No. 2009-212984

Patent Document 3: Japanese Laid-open Patent Publication No. 2010-88031

However, with the conventional technology that identifies a virtual machine affected by a failure from an FDB and that identifies the affected tenant and the affected failure path, there is a problem in that the affected tenant and the failure path are not accurately identified. Specifically, if a virtual machine that has ended communication before a failure is registered in an FDB, a path in which the communication has ended is identified as a failure path. Furthermore, if a virtual machine that starts communication after the occurrence of a failure is registered in an FDB, a communication path that is not affected by the failure is identified as a failure path.

SUMMARY

According to an aspect of an embodiment, an information processing system includes a first information processing apparatus that executes a first virtual machine belonging to a first tenant and that executes a second virtual machine belonging to a second tenant; a second information processing apparatus that executes a third virtual machine belonging to the first tenant and that executes a fourth virtual machine belonging to the second tenant; a first switch device that is connected to the first information processing apparatus; a second switch device that is connected to the second information processing apparatus; a third switch device that is connected to the first switch device and the second switch device; a fourth switch device that is connected to the first switch device and the second switch device; and a management device that manages the first and the second information processing apparatuses and the first to the fourth switch devices. The management device includes an elapsed time referring unit that refers to elapsed time information related to each sending source address that is held by one of the first to the fourth switch devices, a transmission time referring unit that refers to transmission time information related to each sending source address that is held by a virtual switch that is executed by one of the first and the second information processing apparatuses, and an identifying unit that identifies a failure path on the basis of the elapsed time information referred to by the elapsed time referring unit or on the basis of the transmission time information referred to by the transmission time referring unit.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 5 is a schematic diagram illustrating an example of an FDB included in a virtual switch;

FIG. 6 is a schematic diagram illustrating an example of a VM allocation information storing unit;

FIG. 7 is a schematic diagram illustrating an example of a tunnel path information storing unit;

FIG. 31 is a schematic diagram illustrating the result of extracting entries in each of which the output destination corresponds to a failure link;

FIG. 32 is a schematic diagram illustrating the result of extracting entries in each of which the aging time is equal to or less than 2 seconds;

FIG. 33 is a schematic diagram illustrating the result of extracting virtual machines in each of which the failure occurrence time is greater than the transmission time;

FIG. 34 is a schematic diagram illustrating the result of identifying a failure affected tenant;

FIG. 35 is a schematic diagram illustrating the result of identifying a tunnel and a passing route;

DESCRIPTION OF EMBODIMENT

A preferred embodiment of the present invention will be explained with reference to accompanying drawings. The embodiment does not limit the disclosed technology.

Figure 1:
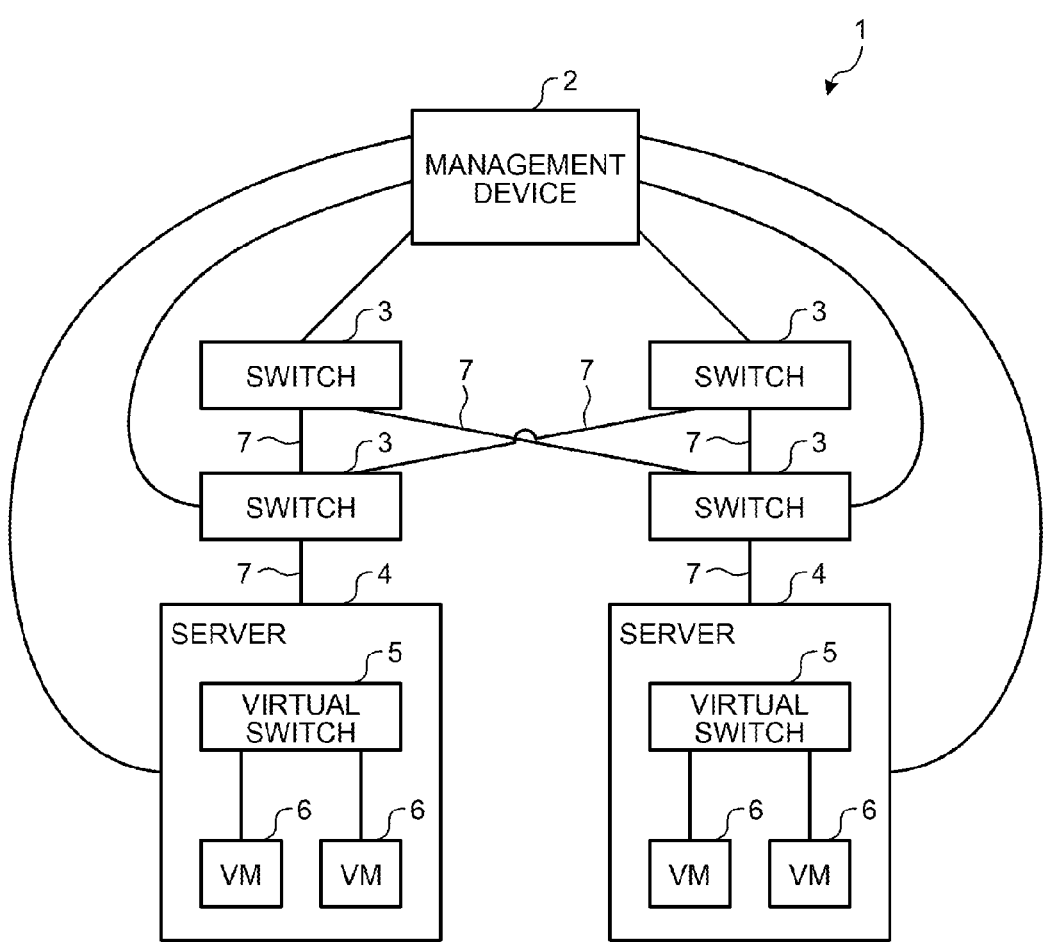
FIG. 1 is a schematic diagram illustrating the configuration of an information processing system according to an embodiment.

First, the configuration of an information processing system according to an embodiment will be described. FIG. 1 is a schematic diagram illustrating the configuration of an information processing system according to the embodiment. As illustrated in FIG. 1, an information processing system 1 includes a management device 2, four switches 3, and two servers 4. Here, for convenience of description, only the two servers 4 and the four switches 3 are illustrated; however, the information processing system 1 includes an arbitrary number of the servers 4 and the switches 3.

The management device 2 manages the servers 4 and the switches 3. For example, if a failure occurs in the information processing system 1, the management device 2 identifies a communication path and a tenant affected by the failure. The management device 2 is connected to each of the switches 3 and the servers 4 and can refer to the information stored in each of the switches 3 and the servers 4.

The switches 3 are devices that relay packets that are sent and received to and from the servers 4. The servers 4 are devices that perform information processing by communicating with each other. The server 4 is connected to a single switch 3 by a link 7. There are two types of switches 3: the switch 3 belonging to a lower layer and the switch 3 belonging to a higher layer. The switch 3 that is directly connected to the server 4 belongs to the lower layer and the switch 3 that is connected to the switch 3 belonging to the lower layer belongs to the higher layer. The switch 3 belonging to the higher layer is connected to the switch 3 belonging to the lower layer by the link 7. In FIG. 1, the switches 3 are arranged in two layers; however, if the number of the switches 3 is great, the switches 3 may also be arranged in three or more layers.

In the server 4, two VMs 6 and a virtual switch 5 are running. The VM 6 is a virtual machine to which the resources of the server 4 are allocated to run. The virtual switch is a virtual switch that is used when a virtual machine communicates. Here, a case is indicated in which two VMs 6 are running on the server 4; however, three or more VMs 6 may also be running on the server 4.

Figure 37:
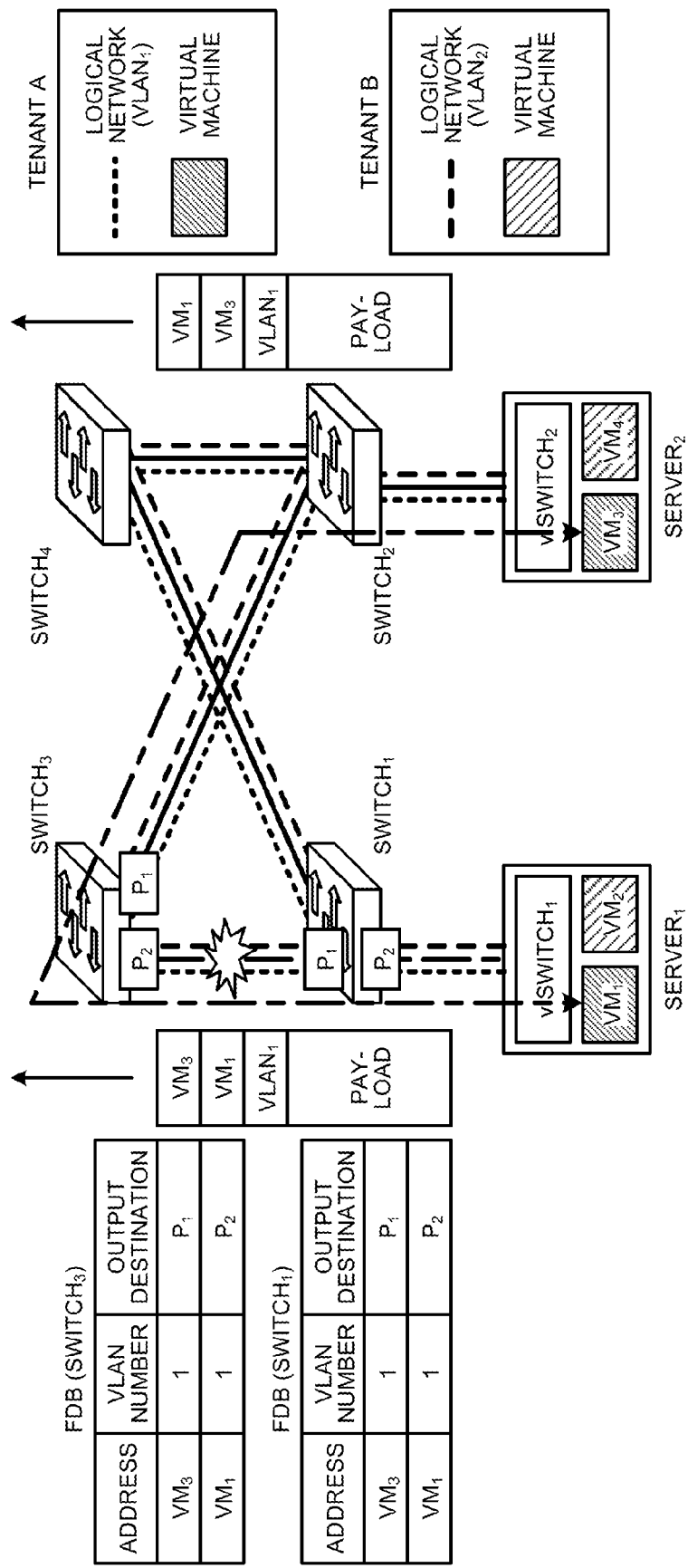
FIG. 37 is a schematic diagram illustrating a method for identifying tenants in communication when a failure has occurred.

The information processing system 1 uses a tunnel when communication is performed between the servers 4. If a tunnel is used when communication is performed between the servers 4, the communication is encapsulated by the server 4. As illustrated in FIG. 37, when a VLAN is used, the number of VLANs is limited to about 4000; however, this limit can be eliminated by using a tunnel.

Figure 2:
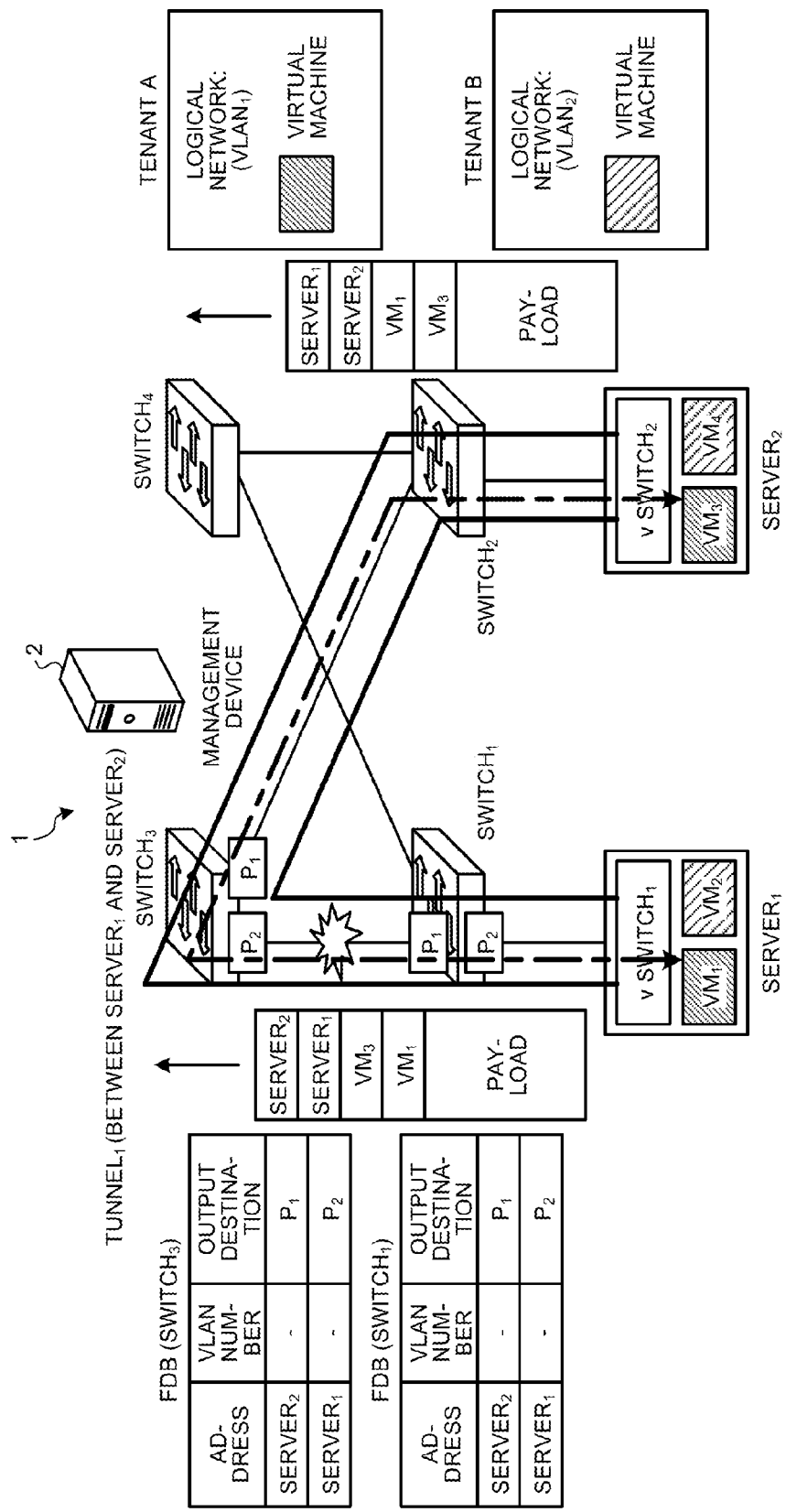
FIG. 2 is a schematic diagram illustrating a tunnel.

FIG. 2 is a schematic diagram illustrating a tunnel. In FIG. 2, a server$_1$ and a server$_2$ correspond to the servers 4 illustrated in FIG. 1 and a switch$_1$ to a switch$_4$ corresponds to the switch 3 illustrated in FIG. 1. When compared with the case illustrated in FIG. 37, if a tunnel is used for the communication between the servers, the address of the server of the sending destination and the address of the sending source are attached to the top of the packet. Here, the address is a media access control (MAC) address and an IP address.

In the packet that is sent from the server$_1$ to the server$_2$, the address of the server$_2$ is attached as the address of the sending destination and the address of the server$_1$ is attached as the address of the sending source. In the packet that is sent from the server$_2$ to the server$_1$, the address of the server$_1$ is attached to the address of the sending destination and the address of the server$_2$ is attached to the address of the sending source. Note that, in FIG. 2, the address of the server$_1$ is simply represented by the "server$_1$" and the address of the server$_2$ is simply represented by the "server$_2$" in the packet.

Each of the switches transfers a packet by using the address of a server. Specifically, the address registered in an FDB is not the address of a virtual machine but is the address of the server. Accordingly, even if the management device 2 refers to the FDB stored in a switch, the management device 2 is not able to directly identify a virtual machine that is in communication. Consequently, if a failure occurs, the management device 2 uses information other than the FDB stored in the switch in order to identify a virtual machine that is in communication. Note that, a VLAN is used for the communication in the server.

Figures 3, 4:
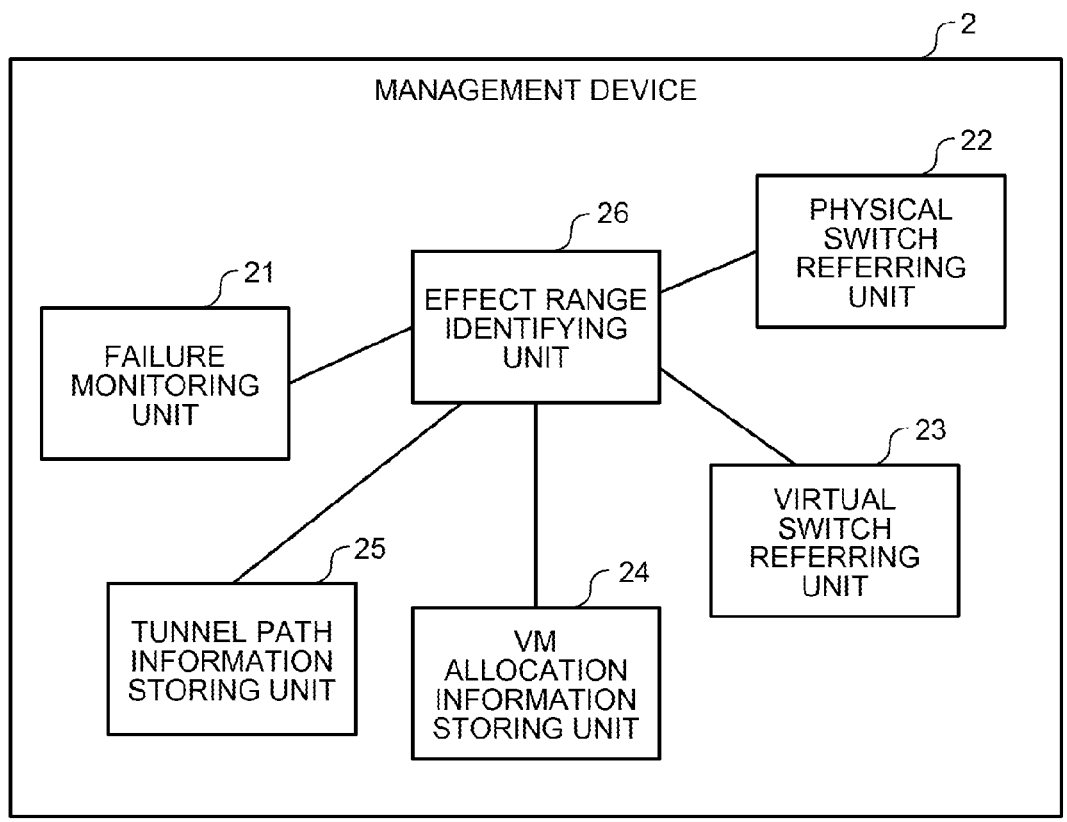
FIG. 3 is a schematic diagram illustrating the functional configuration of a management device.
FIG. 4 is a schematic diagram illustrating an example of an FDB included in a switch.

In the following, the functional configuration of the management device 2 will be described. FIG. 3 is a schematic diagram illustrating the functional configuration of the management device 2. As illustrated in FIG. 3, the management device 2 includes a failure monitoring unit 21, a physical switch referring unit 22, a virtual switch referring unit 23, a VM allocation information storing unit 24, a tunnel path information storing unit 25, and an effect range identifying unit 26.

The failure monitoring unit 21 detects a failure occurring in the link 7 and gives information on the detected link 7 to the effect range identifying unit 26. The physical switch referring unit 22 refers to the FDB stored in the switch 3 and gives the referring result to the effect range identifying unit 26. FIG. 4 is a schematic diagram illustrating an example of an FDB included in the switch 3. As illustrated in FIG. 4, the FDB included in the switch 3 stores therein, in an associated manner, the address, the VLAN number, and the output destination. The address is the address of the server 4 of the sending destination of a packet and the VLAN number is an identifier for identifying a VLAN. The output destination is the ID of a port that outputs the packet. Here, a VLAN number is not used.

For example, the packet whose destination is the server$_2$, i.e., the packet in which the address of the sending destination is the address of the server$_2$, is output to the port P$_1$. In FIG. 4, the address of the server$_1$ is simply represented as the "server$_1$" and the address of the server$_2$ is simply represented by the "server$_2$".

The virtual switch referring unit 23 refers to the FDB and the address resolution protocol (ARP) management table stored in the virtual switch 5 and gives the referring result to the effect range identifying unit 26. FIG. 5 is a schematic diagram illustrating an example of an FDB included in a virtual switch 5. As illustrated in FIG. 5, the FDB included in the virtual switch 5 stores therein, in an associated manner the address, the VLAN number, the output destination, and the aging time.

The address is the address of the VM 6 that corresponds to the sending destination of a packet and the VLAN number is the identifier for identifying a VLAN. The output destination is the ID of the port that outputs a packet and the aging time is the elapsed time since communication has occurred (the unit of time is, for example, seconds). The aging time is reset every time communication occurs.

For example, the packet whose destination is the VM$_3$, i.e., the packet in which the address of the sending destination is the address of the VM$_3$, uses the VLAN with the ID of "1" and is output to the port P$_1$. The elapsed time after communication has occurred is 10 seconds. In FIG. 5, the address of the VM$_1$ is simply represented by the "VM$_1$" and the address of the $VM_3$ is simply represented by the "$VM_3$". The ARP management table will be described later.

The VM allocation information storing unit 24 stores therein VM allocation information that indicates the allocation state of virtual machines. FIG. 6 is a schematic diagram illustrating an example of the VM allocation information storing unit 24. As illustrated in FIG. 6, the VM allocation information storing unit 24 stores therein the tenant name, the VM name, and the server name for each tenant. The tenant name is the name of a tenant. The VM name is the name of a virtual machine allocated in a tenant. The server name is the name of a server in which a virtual machine is executed. For example, in the tenant with the name of "A", the virtual machines "$VM_1$" and "$VM_3$" are allocated; the "$VM_1$" is executed by the "$server_1$" and the "$VM_3$" is executed by the "$server_2$".

The tunnel path information storing unit 25 stores therein tunnel path information that indicates a path for a tunnel. FIG. 7 is a schematic diagram illustrating an example of the tunnel path information storing unit 25. As illustrated in FIG. 7, the tunnel path information storing unit 25 stores therein, for each tunnel, a communication pair, the tunnel ID, and a path. The communication pair is a pair of the servers 4 that communicate with each other by using a tunnel. The tunnel ID is an identifier for identifying a tunnel. The path is the name of the link 7 that constructs the passing route of the tunnel. For example, for the tunnel that is used for communication between the "$server_1$" and the "$server_3$", the identifier of the tunnel is "1", the passing route is the "$link_1$", the "$link_3$", and the "$link_7$" in the order from the "$server_1$".

When a failure occurs in a link, on the basis of the FDB in a switch, on the basis of the FDB and the ARP management table in a virtual switch, and on the basis of the VM allocation information and the tunnel path information, the effect range identifying unit 26 identifies a tenant and a passing route affected by the failure.

Figure 8:
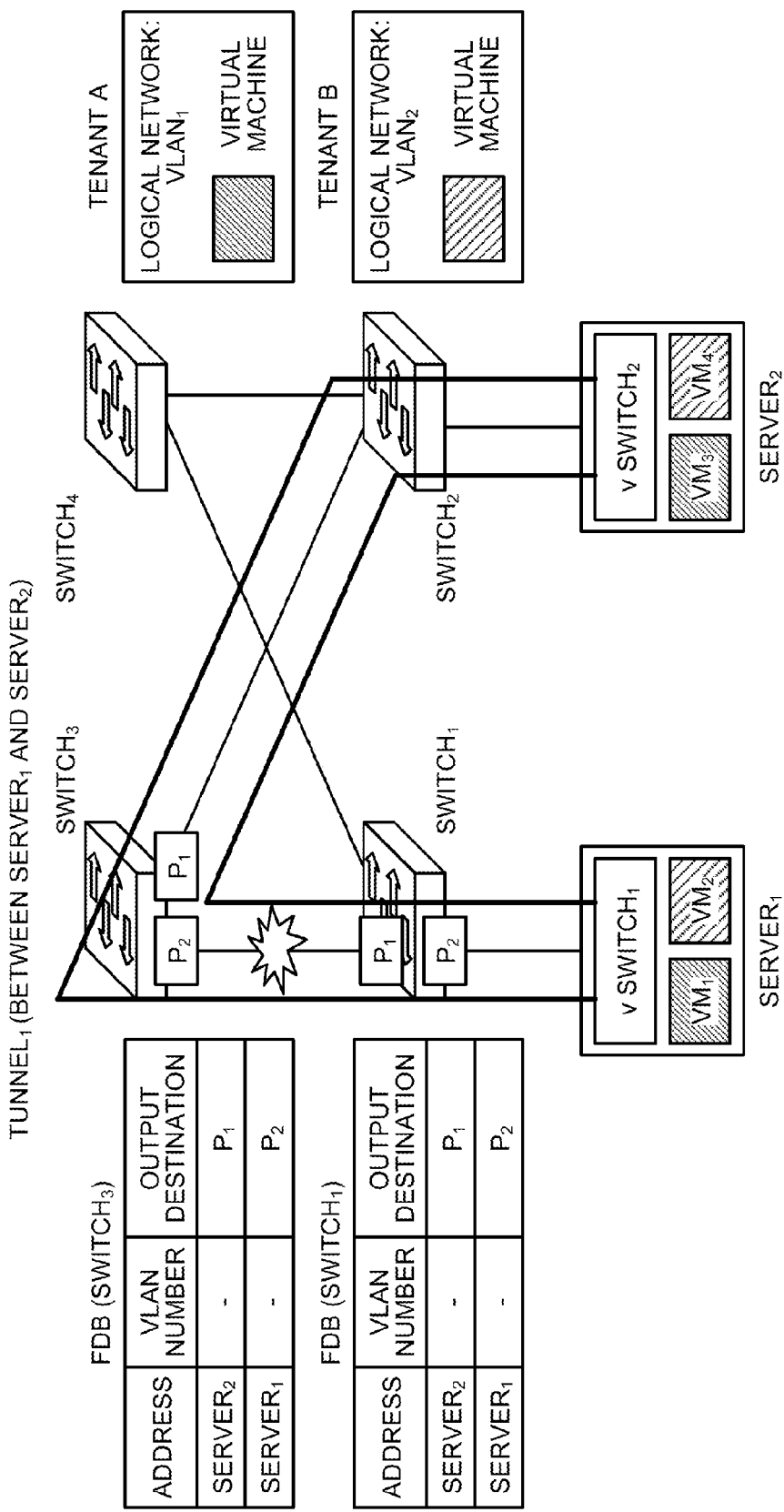
FIG. 8 is a schematic diagram illustrating an identifying method of a server that was in communication by using a link in which a failure occurred.

FIGS. 8 to 11 are schematic diagrams each illustrating a method of identifying the effect range performed by the effect range identifying unit 26. First, by using the FDBs included in the switches at both ends of the link in which the failure occurred, the effect range identifying unit 26 identifies the server that was in communication by using the link in which the failure occurred. FIG. 8 is a schematic diagram illustrating an identifying method of a server that was in communication by using the link in which the failure occurred.

In FIG. 8, when a failure occurs in the $link_3$, the effect range identifying unit 26 refers to the FDBs included in the $switch_1$ and the $switch_3$ at both ends of the $link_3$ via the physical switch referring unit 22. Because the output port of the $switch_1$ to the $link_3$ is the port $P_1$ and the sending destination of the packet that is output to the port $P_1$ is the $server_2$, which is indicated in the FDB included in the $switch_1$, the effect range identifying unit 26 identifies the $server_2$ as the server that was in communication. Similarly, because the output port of the $switch_3$ to the $link_3$ is the port $P_2$ and the sending destination of the packet that is output to the port $P_2$ is the $server_1$, which is indicated in the FDB included in the $switch_3$, the effect range identifying unit 26 identifies the $server_1$ as the server that was in communication. Accordingly, the effect range identifying unit 26 identifies that communication was being performed between the $server_1$ and the $server_2$.

Figure 9:
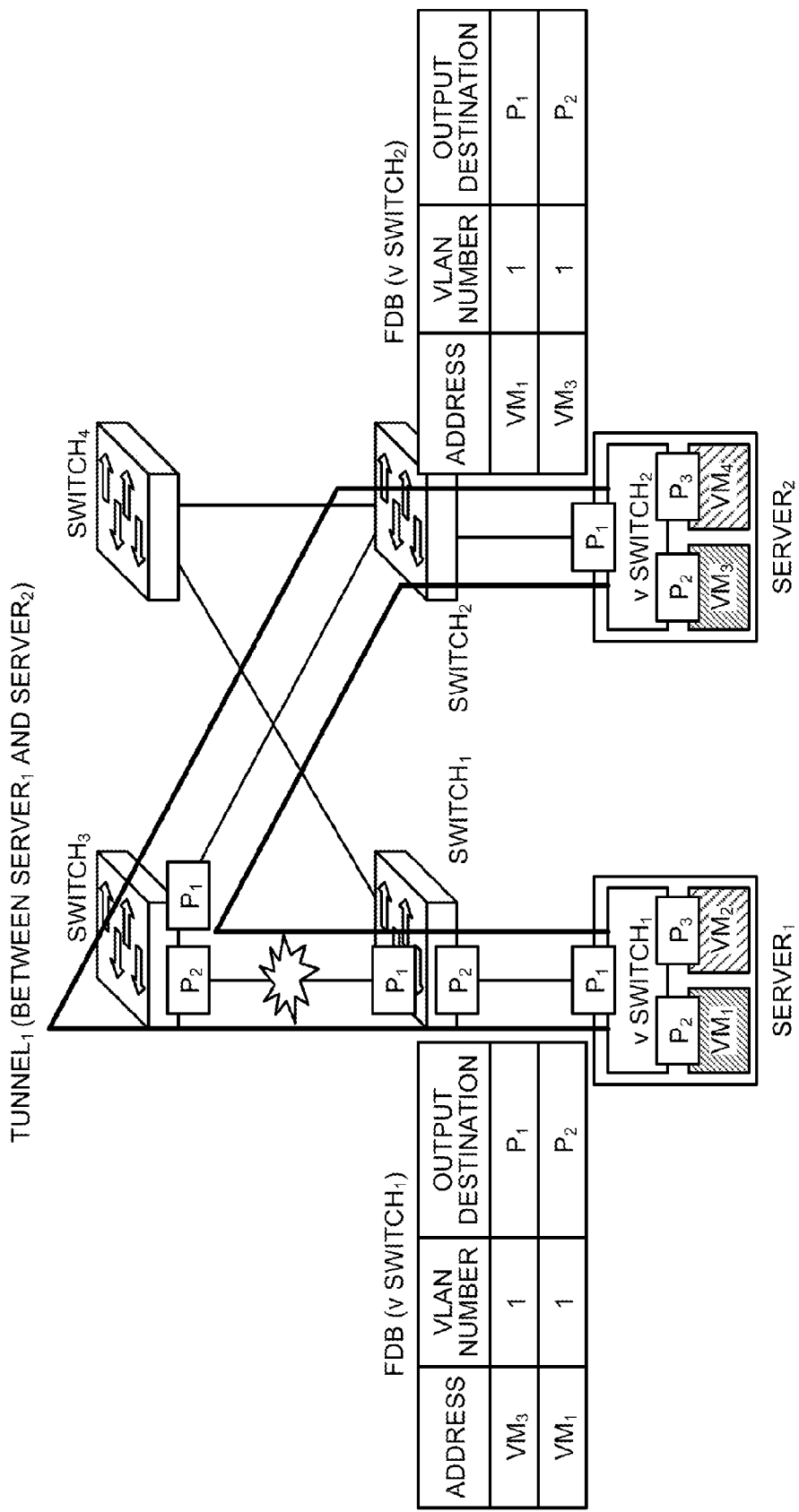
FIG. 9 is a schematic diagram illustrating an identifying method of a virtual machine that was in communication on the server.

Then, the effect range identifying unit 26 refers to the FDB in the virtual switch, which is running on the identified server, via the virtual switch referring unit 23, and then identifies the virtual machine registered in the FDB as the virtual machine that was in communication. FIG. 9 is a schematic diagram illustrating an identifying method of a virtual machine that was in communication on the server.

In FIG. 9, the virtual machines registered in the FDB in the $virtual switch_1$ that is running on the $server_1$ are the $VM_1$ and the $VM_3$, whereas the virtual machines registered in the FDB in the $virtual switch_2$ that is running on the $server_2$ are the $VM_1$ and the $VM_3$. Accordingly, the effect range identifying unit 26 identifies the $VM_1$ and the $VM_3$ as the virtual machines that were in communication by using the $link_3$ in which a failure occurred.

Then, the effect range identifying unit 26 refers to the VM allocation information and identifies the tenant to which the $VM_1$ and the $VM_3$ belong as a tenant that is affected by the failure. For example, if the VM allocation information is one illustrated in FIG. 6, the effect range identifying unit 26 identifies the tenant A to which the $VM_1$ and the $VM_3$ belong as a tenant that is affected by the failure. Here, the "tenant A" is the tenant with the tenant name of "A".

Then, the effect range identifying unit 26 refers to the tunnel path information and identifies a passing route for a tunnel that is used when the servers communicate. For example, if the tunnel path information is one illustrated in FIG. 7, because the "$link_3$" is included in the tunnel that has the tunnel ID of "2" in the path information and that is used for the communication between the $server_1$ and the $server_2$, the effect range identifying unit 26 identifies the tunnel with the tunnel ID of "2" as a failure path.

However, with the identifying method of the virtual machine illustrated in FIG. 9, there may be a case in which the virtual machine that is used by the tenant that had ended communication before a failure occurred is registered in the FDB in the virtual switch. Therefore, the effect range identifying unit 26 identifies, by using the aging time indicated in the FDB stored in the virtual switch, the virtual machine that is used by the tenant that had ended communication before the failure occurred and excludes the virtual machine from the virtual machines affected by the failure.

Figure 10:
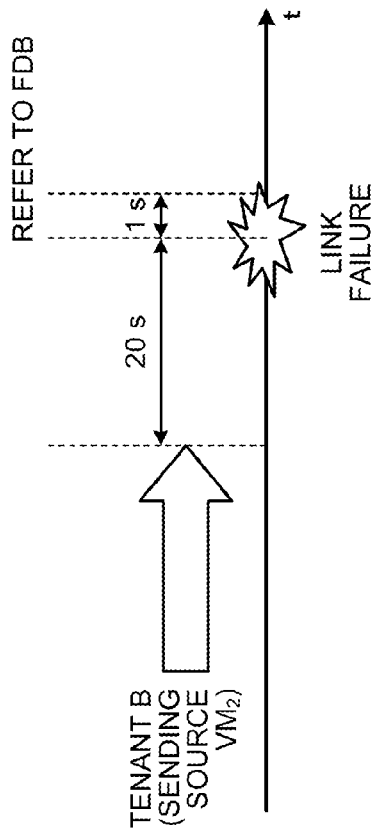
FIG. 10 is a schematic diagram illustrating an identifying method of a tenant that had ended communication before a failure occurred.

FIG. 10 is a schematic diagram illustrating an identifying method of a tenant that had ended communication before a failure occurred. As illustrated in FIG. 10, it is assumed that the FDB in the virtual switch is referred to 1 second (1 s) after a link failure and it is assumed that the aging time of the virtual machine "$VM_2$" is 21 seconds. In this case, because the value of the aging time is greater than the elapsed time since the link failure has occurred, the effect range identifying unit 26 can identify that the virtual machine "$VM_2$" was not in communication when the failure occurred.

Accordingly, the effect range identifying unit 26 can excludes the virtual machine "$VM_2$" from the virtual machines affected by the failure. Furthermore, the effect range identifying unit 26 can exclude the tenant B from the tenants affected by the failure by using the VM allocation information illustrated in FIG. 6. Note that, this identifying method is considered on the basis of the assumption that time synchronization is performed among all of the devices included in the information processing system 1.

Furthermore, with the identifying method of the virtual machine illustrated in FIG. 9, there may be a case in which the virtual machine that is used by the tenant that started communication after a failure had occurred is registered in the FDB in the virtual switch. Therefore, the effect range identifying unit 26 identifies the virtual machine by monitoring an ARP request packet of the virtual machine used by the tenant that started communication after the failure had occurred.

The ARP request is a request broadcasted by the server of the sending source specifying the IP addresses when the MAC address of the sending destination is not found. The ARP request packet is the packet that is sent first time when communication is started. The transmission time of the ARP request packet corresponds to the communication start time.

Figure 11:
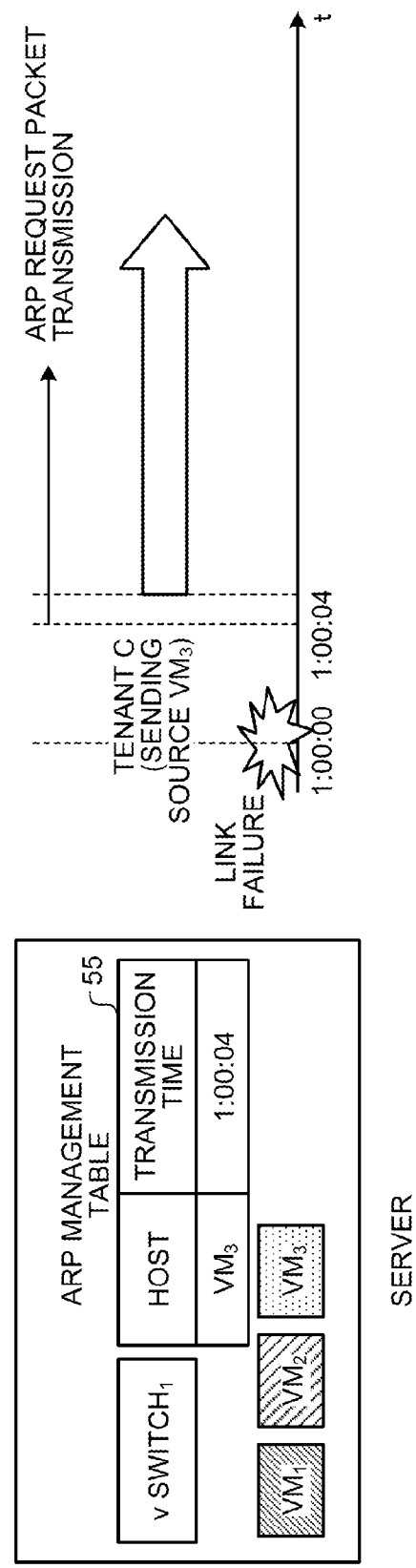
FIG. 11 is a schematic diagram illustrating an identifying method of a tenant that started after a failure had occurred.

FIG. 11 is a schematic diagram illustrating an identifying method of a tenant that started after a failure had occurred. FIG. 11 illustrates a case in which the v switch$_1$ manages the communication start time by using an ARP management table 55. As illustrated in FIG. 11, the ARP management table 55 stores therein, in an associated manner, a host and the transmission time. The host is the MAC address of the virtual machine and the transmission time is the time at which the corresponding virtual machine started communication, i.e., the time at which the ARP request packet was sent.

In FIG. 11, a link failure occurs at time "1:00:00", i.e., at 1:00:00. Furthermore, the communication start time of the virtual machine "VM$_3$" is "1:00:04". Accordingly, the virtual machine "VM$_3$" starts communication after the link failure has occurred and thus the effect range identifying unit 26 can exclude the virtual machine "VM$_3$" from the virtual machines that are affected by the failure. Furthermore, if the tenant that uses the virtual machine "VM$_3$" is assumed to be a tenant C, the tenant C can be excluded from the tenants affected by the failure. Note that, this identifying method is considered on the basis of the assumption that time synchronization is performed among all of the devices included in the information processing system 1.

Figure 12:
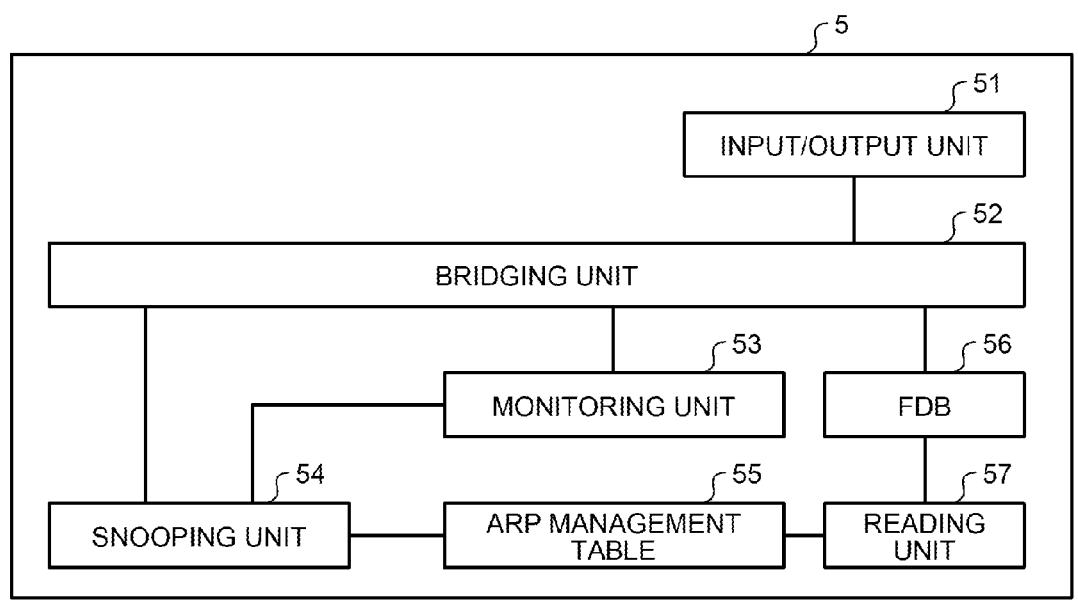
FIG. 12 is a schematic diagram illustrating the functional configuration of the virtual switch.

FIG. 12 is a schematic diagram illustrating the functional configuration of the virtual switch 5. As illustrated in FIG. 12, the virtual switch 5 includes an input/output unit 51, a bridging unit 52, a monitoring unit 53, a snooping unit 54, the ARP management table 55, an FDB 56, and a reading unit 57.

The input/output unit 51 sends and receives a packet to and from the VM 6 and switch 3 via a port. The bridging unit 52 refers to the FDB 56 and performs the routing of a packet. Furthermore, the bridging unit 52 updates the FDB 56 on the basis of the sending source of the received packet and the receiving port.

Figure 13A:
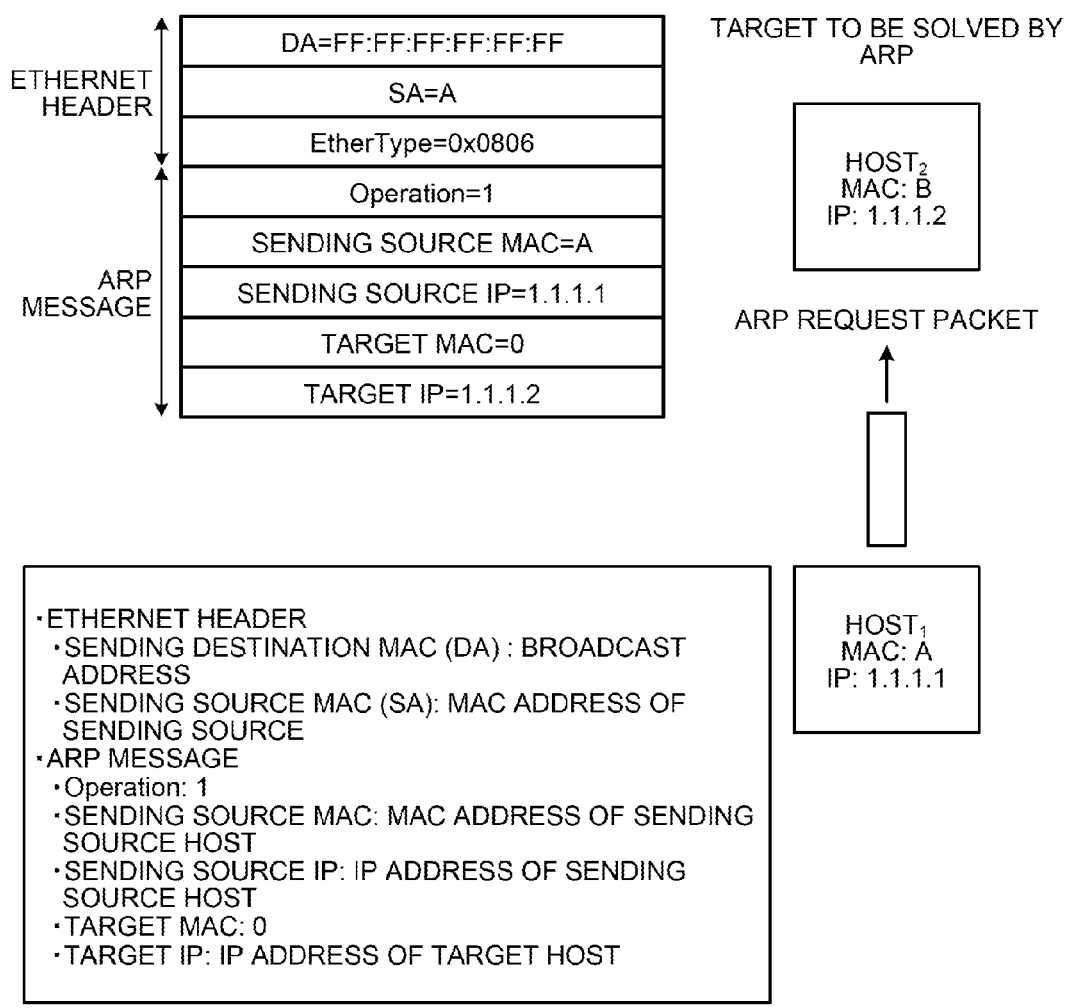
FIG. 13A is a schematic diagram illustrating the packet format of an ARP request.

The monitoring unit 53 monitors an ARP request packet from among the packets subjected to routing by the bridging unit 52 and, when the monitoring unit 53 finds the ARP request packet, the monitoring unit 53 notifies of the snooping unit 54. FIG. 13A is a schematic diagram illustrating the packet format of an ARP request. As illustrated in FIG. 13A, the ARP request packet includes therein an Ethernet (registered trademark) header and an ARP message.

The Ethernet header includes therein a sending destination MAC (DA), a sending source MAC (SA), and the type (EtherType) of packet. For the sending destination MAC, a broadcast address is specified. For the sending source MAC, the MAC address of the sending source host, i.e., a virtual machine of the sending source, is specified. For the type of the packet, "0x0806" is specified. Here, 0x indicates a hexadecimal number.

The ARP message includes therein the Operation that indicates the type of a message, the sending source MAC, the sending source IP, the target MAC, and the target IP. For the Operation, "1" is specified. For the sending source MAC, the MAC address of the sending source host, i.e., a virtual machine of the sending source, is specified. For the sending source IP, the IP address of the sending source host, i.e., the virtual machine of the sending source, is specified. For the target MAC, "0" is specified. For the target IP, the IP address of the target host is specified.

In FIG. 13A, the virtual machine "host$_1$" with the IP address of "1.1.1.1" and with the MAC address of "A" broadcasts the ARP request packet. The virtual machine "host$_2$" with the IP address of "1.1.1.2" and with the MAC address of "B" is the target to be solved by the ARP.

Figure 13B:
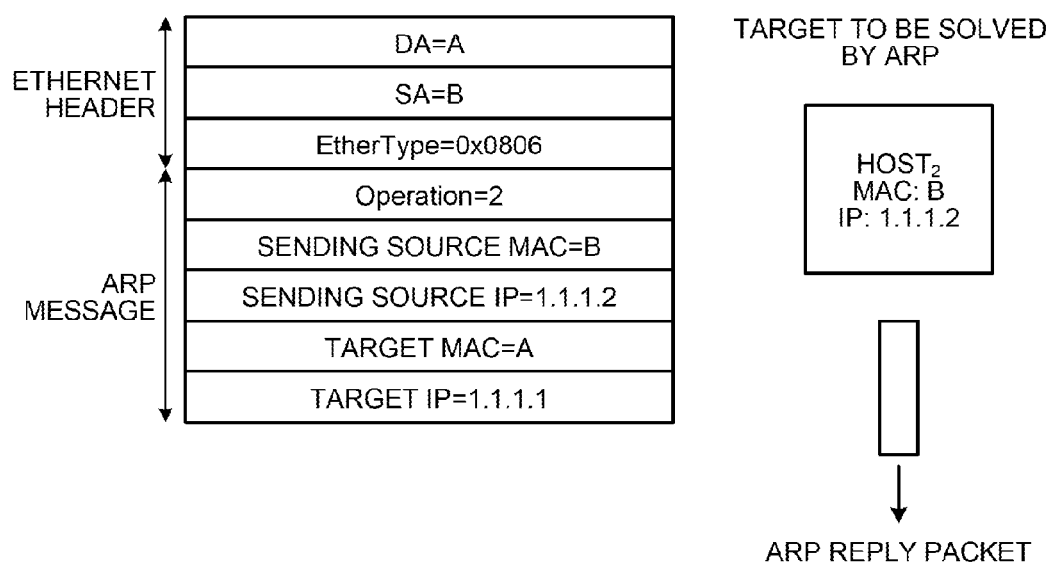
FIG. 13B is a schematic diagram illustrating the packet format of an ARP reply.

FIG. 13B is a schematic diagram illustrating the packet format of an ARP reply. As illustrated in FIG. 13B, the ARP reply packet includes therein the Ethernet header and the ARP message.

Similarly to the ARP request packet, the Ethernet header includes therein a sending destination MAC (DA), a sending source MAC (SA), and the type (EtherType) of packet. For the sending destination MAC, the MAC address of the host that has sent the ARP request is specified. For the sending source MAC, the MAC address of the target host is specified. For the type of packet, "0x0806" is specified.

Similarly to the ARP request packet, the ARP message includes therein the Operation, the sending source MAC, the sending source IP, the target MAC, and the target IP. For the Operation, "2" is specified. For the sending source MAC, the MAC address of the target host is specified. For the sending source IP, the IP address of the target host is specified. For the target MAC, the MAC address of the host that has sent the ARP request is specified. For the target IP, the IP address of the host that has sent the ARP request is specified.

In FIG. 13B, the virtual machine "host$_2$" with the IP address of "1.1.1.2" and with the MAC address of "B" sends back an ARP reply packet. The virtual machine "host$_1$" with the IP address of "1.1.1.1" and with the MAC address of "A" receives the ARP reply packet with respect to the broadcasted ARP requests.

When the snooping unit 54 receives a notification from a monitoring unit 53, the snooping unit 54 snoops the ARP request packet and registers the MAC address of the host and the current time in the ARP management table 55. The ARP management table 55 stores therein, as illustrated in FIG. 11 as an example, the MAC address of the host that has sent the ARP request packet and the transmission time are stored in an associated manner.

As the example illustrated in FIG. 5, the FDB 56 stores therein, in an associated manner, the address of the host of the sending destination of a packet, the VLAN number, the port of the output destination, and the aging time. The reading unit 57 sends the information stored in the FDB 56 to the management device 2 on the basis of the request from the management device 2. The reading unit 57 sends the information stored in the ARP management table 55 to the management device 2 on the basis of the request from the management device 2.

Figure 14A:
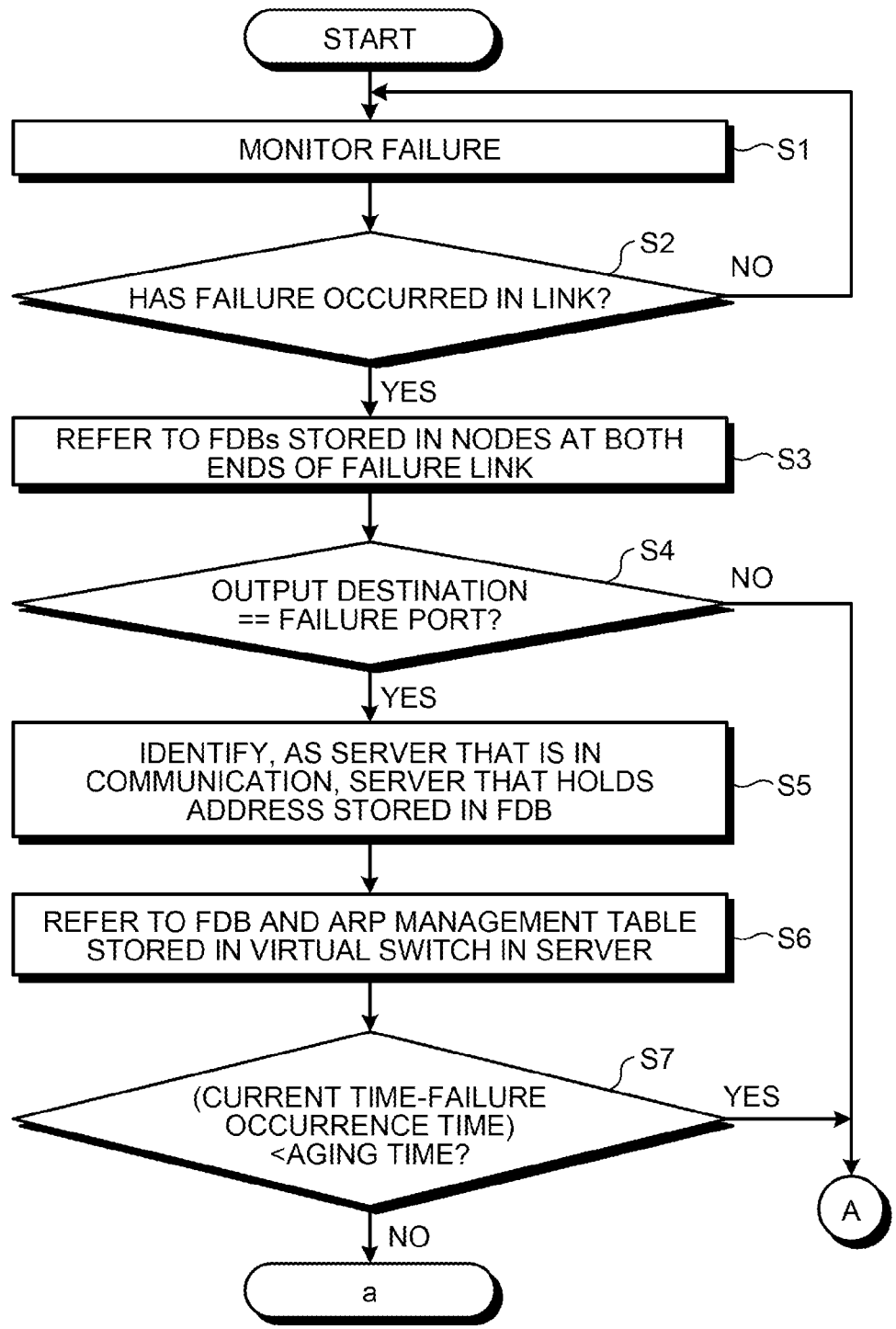
FIG. 14A is a flowchart illustrating the flow of an effect range identifying process performed by the management device.
Figure 14B:
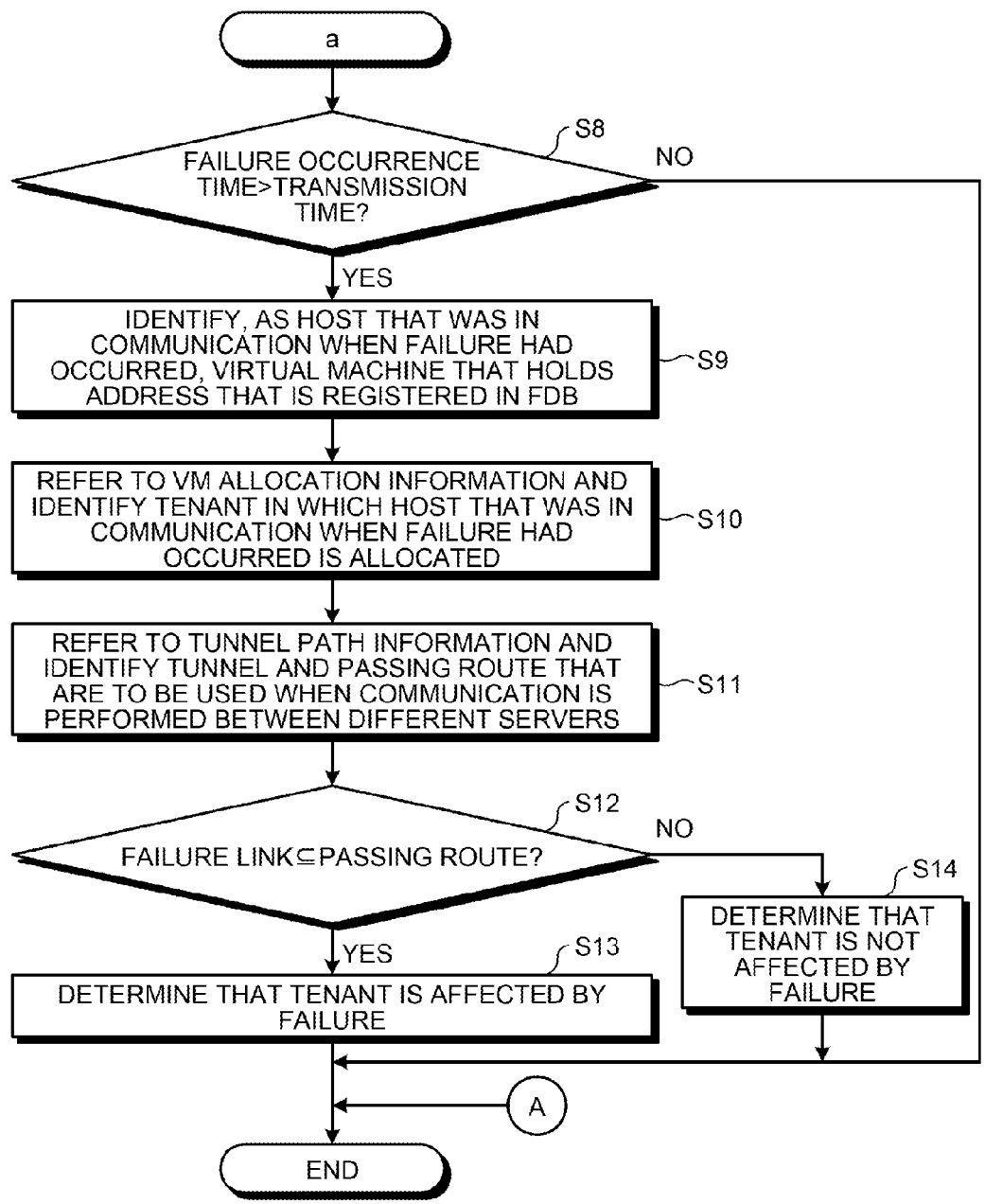
FIG. 14B is a flowchart illustrating the flow of an effect range identifying process performed by the management device.

In the following, the flow of an effect range identifying process performed by the management device 2 will be described. FIG. 14A and FIG. 14B are flowcharts illustrating the flow of an effect range identifying process performed by the management device 2. As illustrated in FIG. 14A, the failure monitoring unit 21 monitors a failure (Step S1) and determines whether a failure occurs in a link 7 (Step S2). If the determination result indicates that a failure does not occur in a link 7, the failure monitoring unit 21 returns to Step S1 and continues to monitor a failure.

In contrast, if a failure occurs in a link 7, the effect range identifying unit 26 refers to the FDB in each of the nodes at both ends of the failure link 7 (Step S3) and determines, for each of the entries in each FDB, whether the output destination corresponds to the failure port (Step S4). Here, the failure port is the port that is connected to the failure link 7. If no entry indicating that the output destination corresponding to the failure port is present, because none of the servers 4 are in communication, the effect range identifying unit 26 ends the process.

In contrast, if an entry indicating that the output destination corresponding to the failure port is present, the effect range identifying unit 26 identifies, as the server 4 that was in communication, the server 4 that holds the address that is stored in the FDB and that is associated with the failure port (Step S5). Then, the effect range identifying unit 26 refers to the FDB 56 and the ARP management table 55 stored in the virtual switch 5 in the server 4 that was in communication (Step S6) and identifies the virtual machines that were assumed to be in communication.

Then, for each of the identified virtual machines, the effect range identifying unit 26 determines whether the difference between the failure occurrence time and the current time, i.e., the elapsed time since the failure has occurred, is smaller than the aging time (Step S7). If the determination result indicates that the elapsed time since a failure has occurred is smaller than the aging time, because the virtual machine corresponding to the aging time had ended communication before the failure occurred, the effect range identifying unit 26 excludes that virtual machine from the virtual machines affected by the failure.

In contrast, if the elapsed time since a failure has occurred is not smaller than the aging time, as illustrated in FIG. 14B, the effect range identifying unit 26 determines whether the failure occurrence time is greater than the transmission time of the ARP management table 55 (Step S8). If the determination result indicates that the failure occurrence time is not greater than the transmission time stored in the ARP management table 55, because this state indicates that the virtual machine associated with the transmission time is the virtual machine that started communication after the failure had occurred, the effect range identifying unit 26 excludes that virtual machine from the virtual machines affected by the failure.

In contrast, if the failure occurrence time is greater than the transmission time of the ARP management table 55, the effect range identifying unit 26 identifies, as the host that was in communication when the failure had occurred, the virtual machine that holds the address that is registered in the FDB and that is associated with the transmission time (Step S9). Then, the effect range identifying unit 26 refers to the VM allocation information and identifies the tenant in which the host that was in communication when the failure had occurred is allocated (Step S10). Then, the effect range identifying unit 26 refers to the tunnel path information and identifies the tunnel and the passing route that are to be used when communication is performed between the different servers 4 (Step S11).

Then, the effect range identifying unit 26 determines whether a failure link is included in the identified passing route (Step S12). If a failure link is included, the effect range identifying unit 26 determines that the tenant identified at Step S10 is affected by a failure (Step S13). In contrast, if a failure link is not included, the effect range identifying unit 26 determines that the tenant identified at Step S10 is not affected by the failure (Step S14).

In this way, on the basis of the aging time in the FDB 56 and the transmission time in the ARP management table 55, the effect range identifying unit 26 excludes the virtual machine that was not in communication when a failure occurred from the virtual machines affected by the failure. Consequently, the management device 2 can accurately identify a tenant that is affected by a failure.

Figure 15:
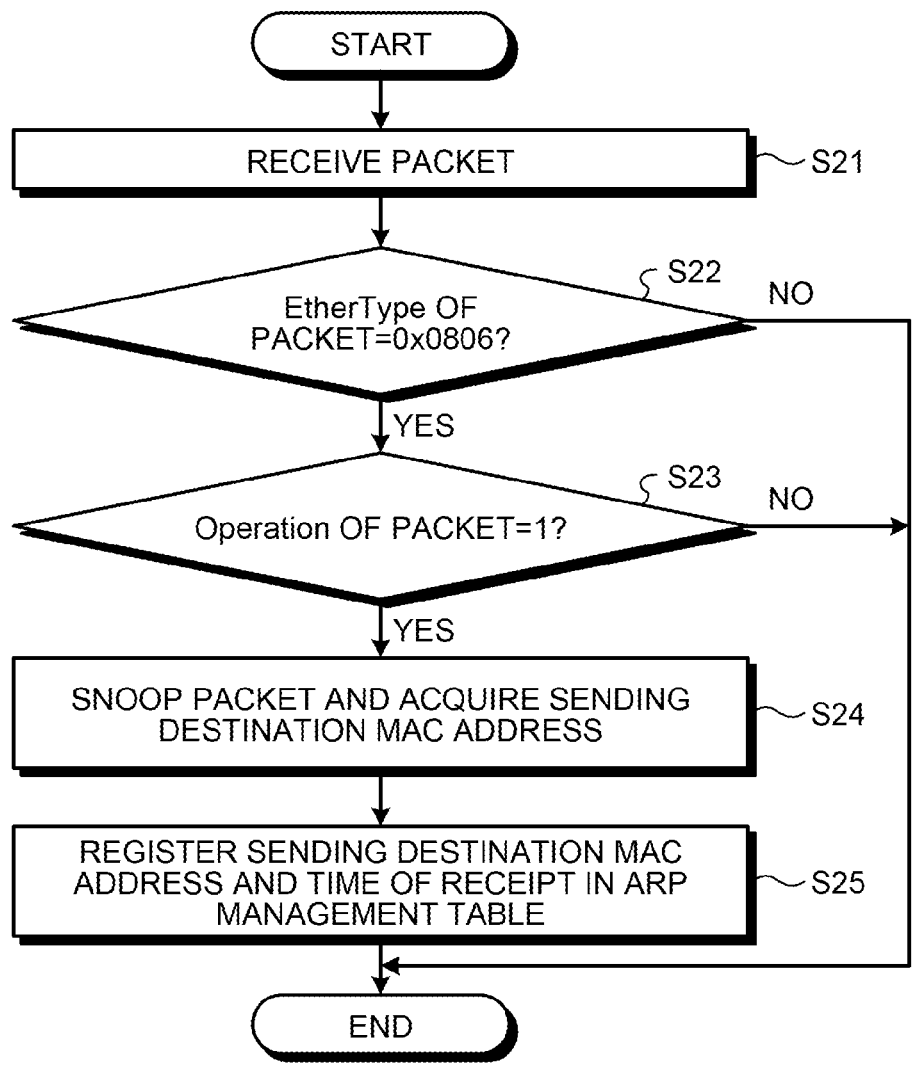
FIG. 15 is a flowchart illustrating the flow of a snooping process of an ARP request packet by the virtual switch.

In the following, the flow of a snooping process of an ARP request packet performed by the virtual switch 5 will be described. FIG. 15 is a flowchart illustrating the flow of a snooping process of an ARP request packet by the virtual switch 5.

As illustrated in FIG. 15, the input/output unit 51 receives a packet (Step S21) and the monitoring unit 53 determines whether the EtherType of the packet is 0x0806 (Step S22). If the determination result indicates that the EtherType of the packet is not 0x0806, the monitoring unit 53 ends the process and waits until the subsequent packet is received.

In contrast, if the EtherType of the packet is 0x0806, the monitoring unit 53 determines whether the Operation of the packet is 1 (Step S23). If the Operation of the packet is not 1, the monitoring unit 53 ends the process and waits until the subsequent packet is received.

In contrast, if the Operation of the packet is 1, the monitoring unit 53 notifies the snooping unit 54 that the packet is an ARP request and then the snooping unit 54 snoops the packet and acquires the sending destination MAC address (Step S24). Then, the snooping unit 54 registers the sending destination MAC address and the time of receipt of the packet in the ARP management table 55 (Step S25). The time of receipt of the packet is managed as the time at which the virtual machine has started communication, i.e., managed as the transmission time to be stored in the ARP management table 55.

In this way, the virtual switch 5 snoops the ARP request packet and registers the sending destination MAC address and the time of receipt of the packet in the ARP management table 55, thereby the effect range identifying unit 26 can recognizes the communication start time of the virtual machine.

Figure 16:
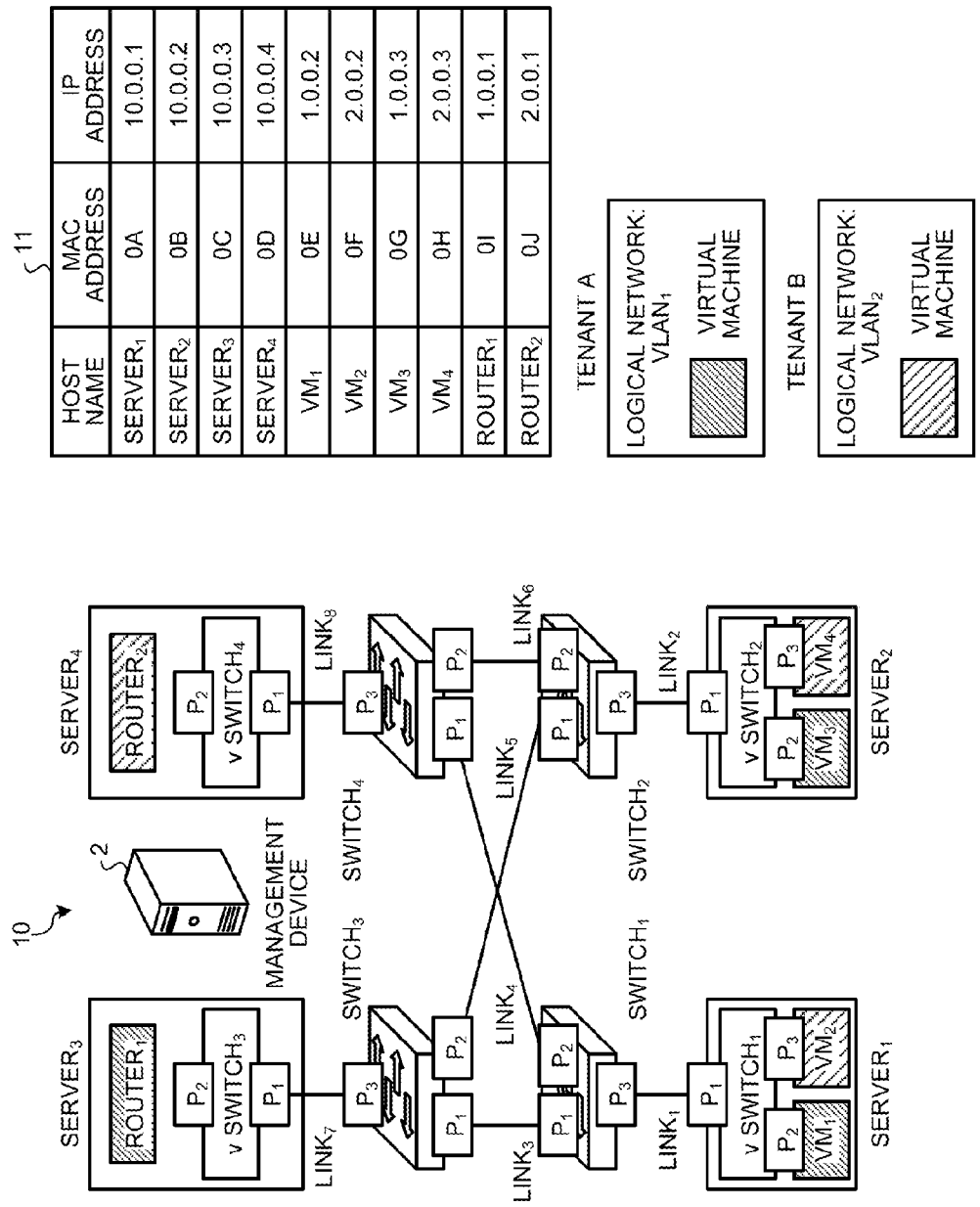
FIG. 16 is a schematic diagram illustrating the configuration of the information processing system that is used for an explanation of an example of identifying an effect range.

In the following, an example of identifying an effect range will be described with reference to FIGS. 16 to 35. FIG. 16 is a schematic diagram illustrating the configuration of the information processing system that is used for an explanation of an example of identifying an effect range. As illustrated in FIG. 16, an information processing system 10 that is used to explain an example of identifying an effect range includes, a server$_3$ and a server$_4$ in addition to the information processing system 1 illustrated in FIG. 2.

The server$_3$ is connected to the switch$_3$ and the server$_4$ is connected to the switch$_4$. The server$_3$ includes a router$_1$ and a v switch$_3$ and the server$_4$ includes a router$_2$ and a v switch$_4$. The router$_1$ and the router$_2$ provide a function of connecting to an external network. The name (host name) of the servers, the virtual machines and the routers, the MAC addresses and the IP addresses are indicated in an address list 11 illustrated in FIG. 16. For example, the MAC address of the server with the name of the "server$_1$" is "0A" and the IP address thereof is "10.0.0.1".

The server$_1$ is connected to the switch$_1$ by a link$_1$, the server$_2$ is connected to the switch$_2$ by a link$_2$, the switch$_1$ is connected to the switch$_3$ by a link$_3$, the switch$_1$ is connected to the switch$_4$ by a link$_4$, the switch$_2$ is connected to the switch$_3$ by a link$_5$, and the switch$_2$ is connected to the switch$_4$ by a link$_6$. The switch$_3$ is connected to the server$_3$ by the link$_7$ and the switch$_4$ is connected to the server$_4$ by a link$_8$. The management device 2 is connected to each of the servers and the switches.

Figure 17:
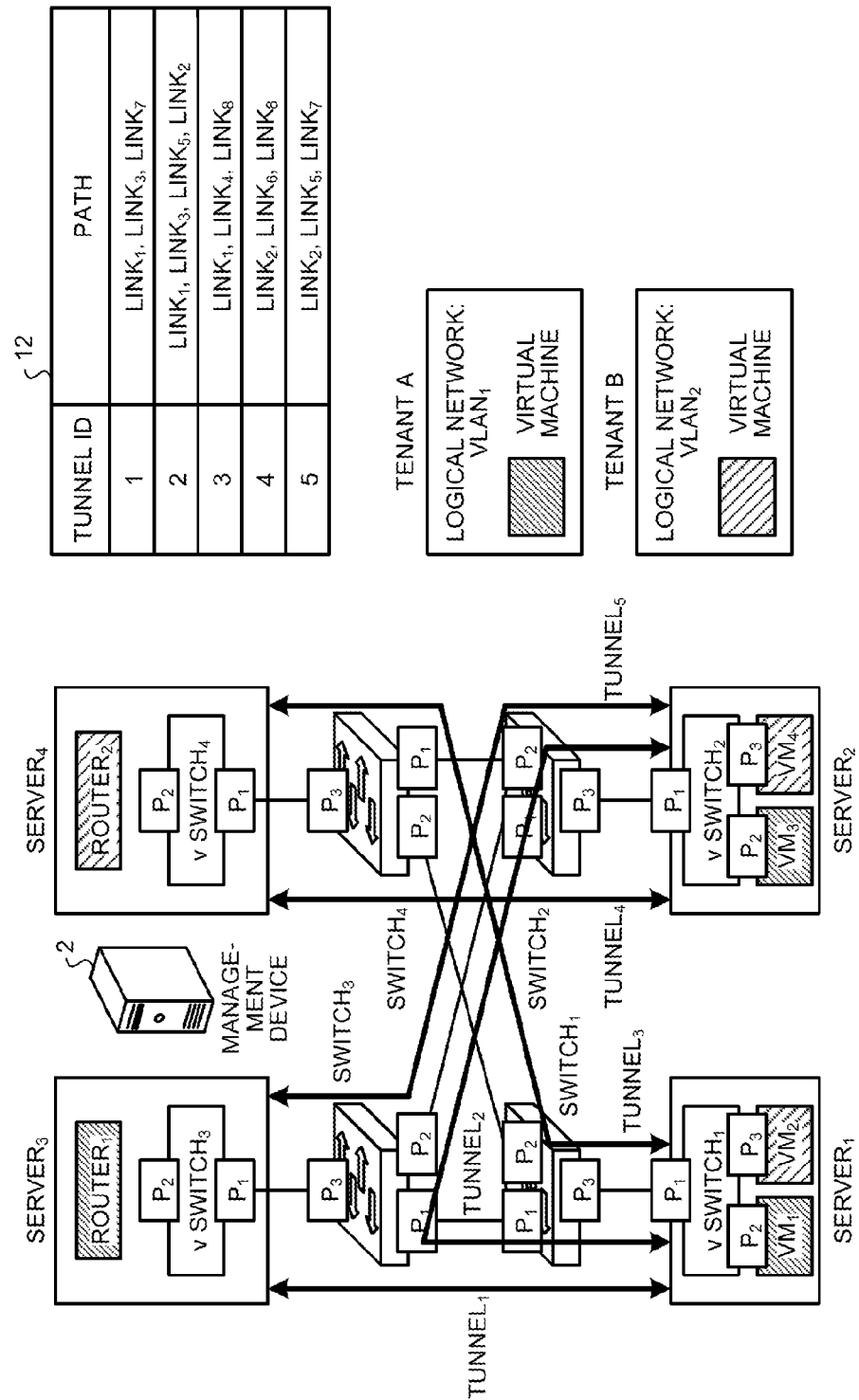
FIG. 17 is a schematic diagram illustrating the configuration of tunnels.

FIG. 17 is a schematic diagram illustrating the configuration of tunnels. As illustrated in FIG. 17, the tunnel$_1$ connects the server$_1$-the switch$_1$-the switch$_3$-the server$_3$, the tunnel$_2$ connects the server$_1$-the switch$_1$-the switch$_3$-the switch$_2$-the server$_2$, and the tunnel$_3$ connects the server$_1$-the switch$_1$-the switch$_4$-the server$_4$. The tunnel$_4$ connects the server$_2$-the switch$_2$-the switch$_4$-the server$_4$ and the tunnel$_5$ connects the server$_2$-the switch$_2$-the switch$_3$-the server$_3$. The association relation between the tunnels and the paths are indicated by a tunnel list 12 illustrated in FIG. 17.

Figure 18:
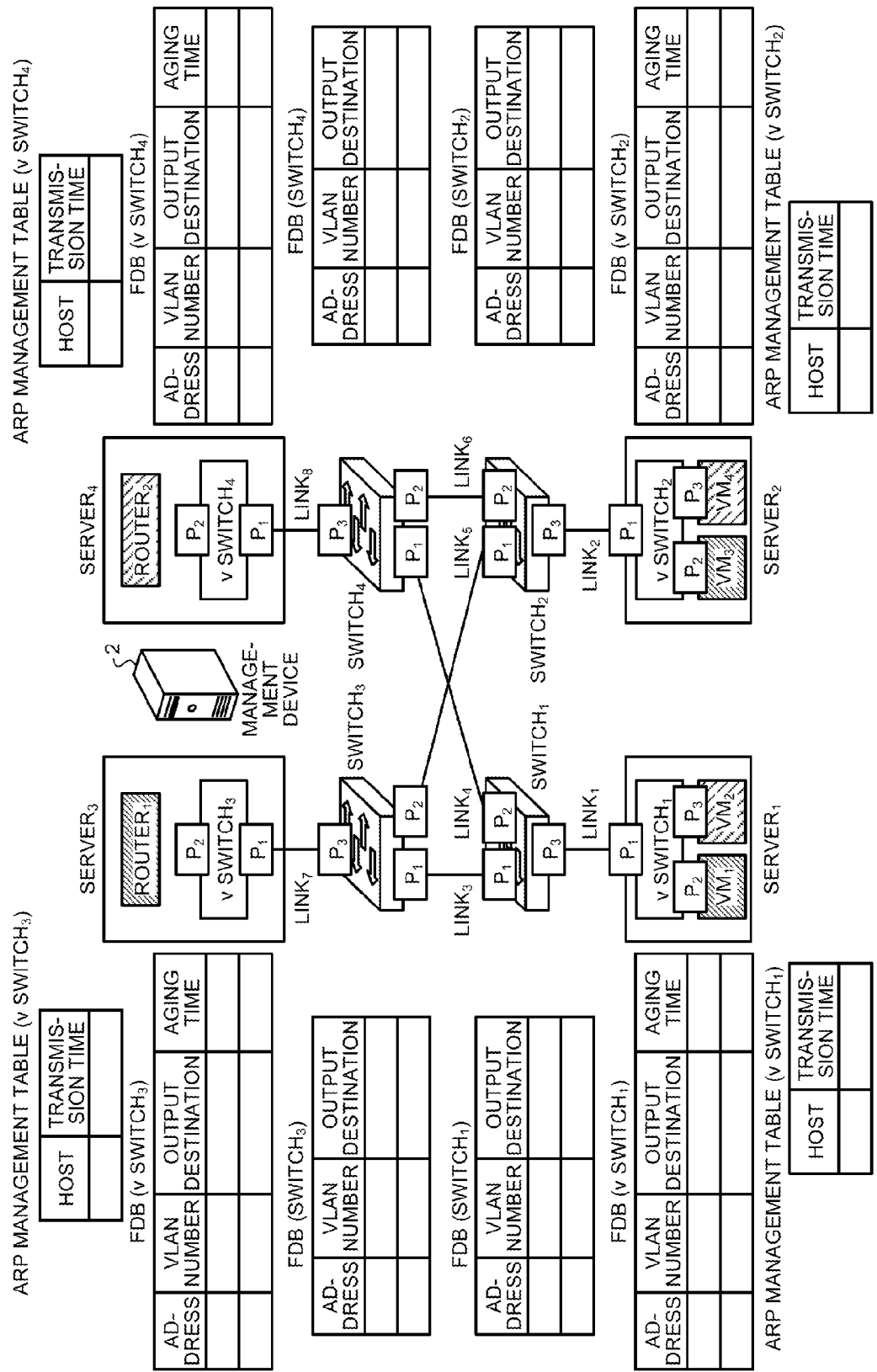
FIG. 18 is a schematic diagram illustrating the initial state of the FDB and an ARP management table at [time 1:00:00]

FIG. 18 is a schematic diagram illustrating the initial state of the FDB and an ARP management table at [time 1:00:00]. As illustrated in FIG. 18, the FDBs stored in the switch$_1$ to the switch$_4$, the FDBs in the v switch$_1$ to the v switch$_4$, and the ARP management tables stored in the v switch$_1$ to the v switch$_4$ have no entry in the initial state.

Figure 19:
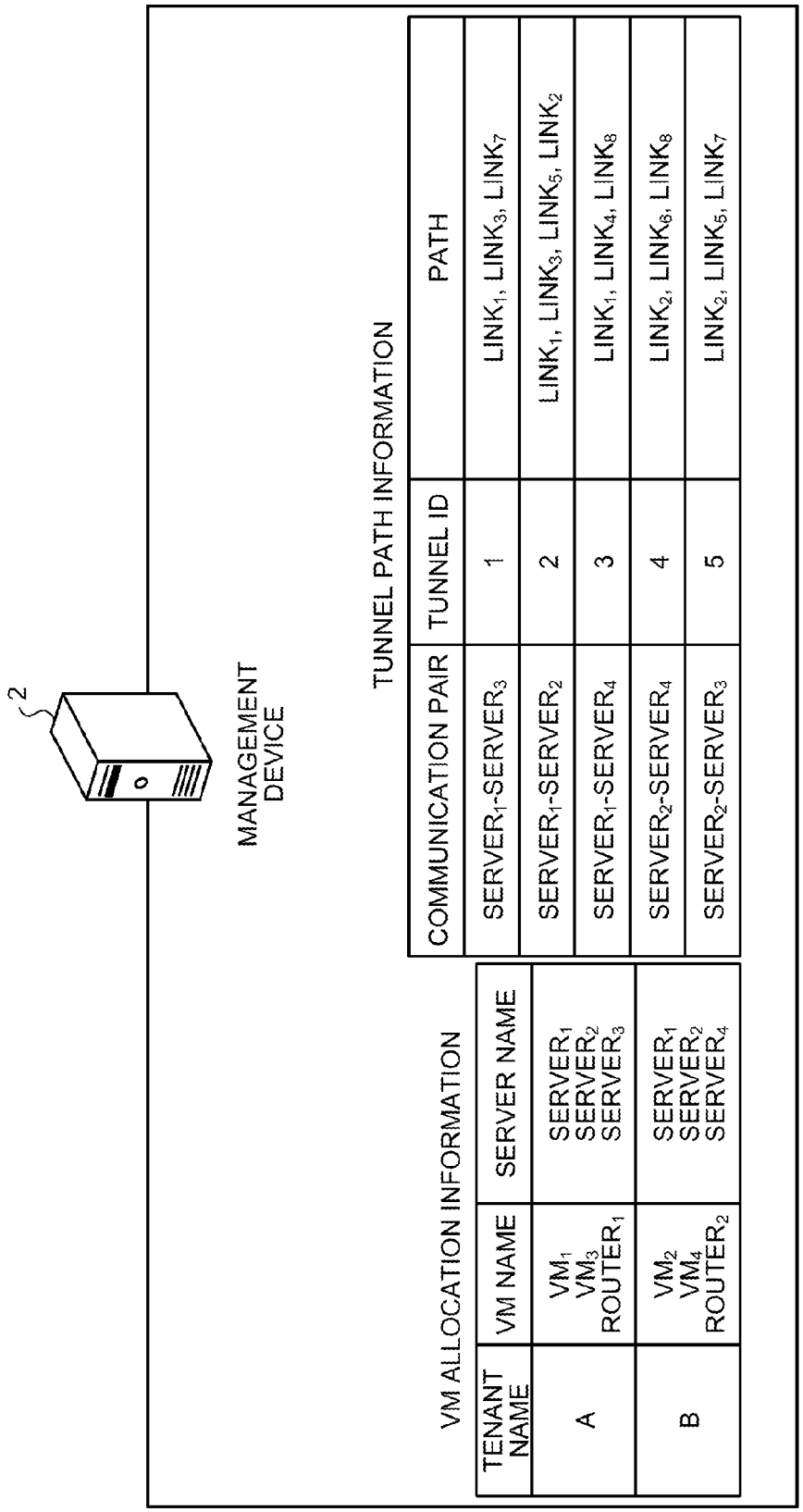
FIG. 19 is a schematic diagram illustrating the initial state of VM allocation information and tunnel path information at [time 1:00:00]

FIG. 19 is a schematic diagram illustrating the initial state of VM allocation information and tunnel path information at [time 1:00:00]. As illustrated in FIG. 19, information on the tenant A and the tenant B is stored as the VM allocation information in the VM allocation information storing unit 24. For example, for the tenant A, the VM$_1$ running on the server$_1$, the VM$_3$ running on the server$_2$, and the router$_1$ running on the server$_3$ are allocated.

Information on the tunnel$_1$ to the tunnel$_5$ is stored as the tunnel path information in the tunnel path information storing unit 25. For example, the tunnel$_1$ is used for the communication between the server$_1$ and the server$_3$ and the path of the tunnel$_1$ is "the link$_1$"-"the link$_3$"-"the link$_7$".

Figure 20:
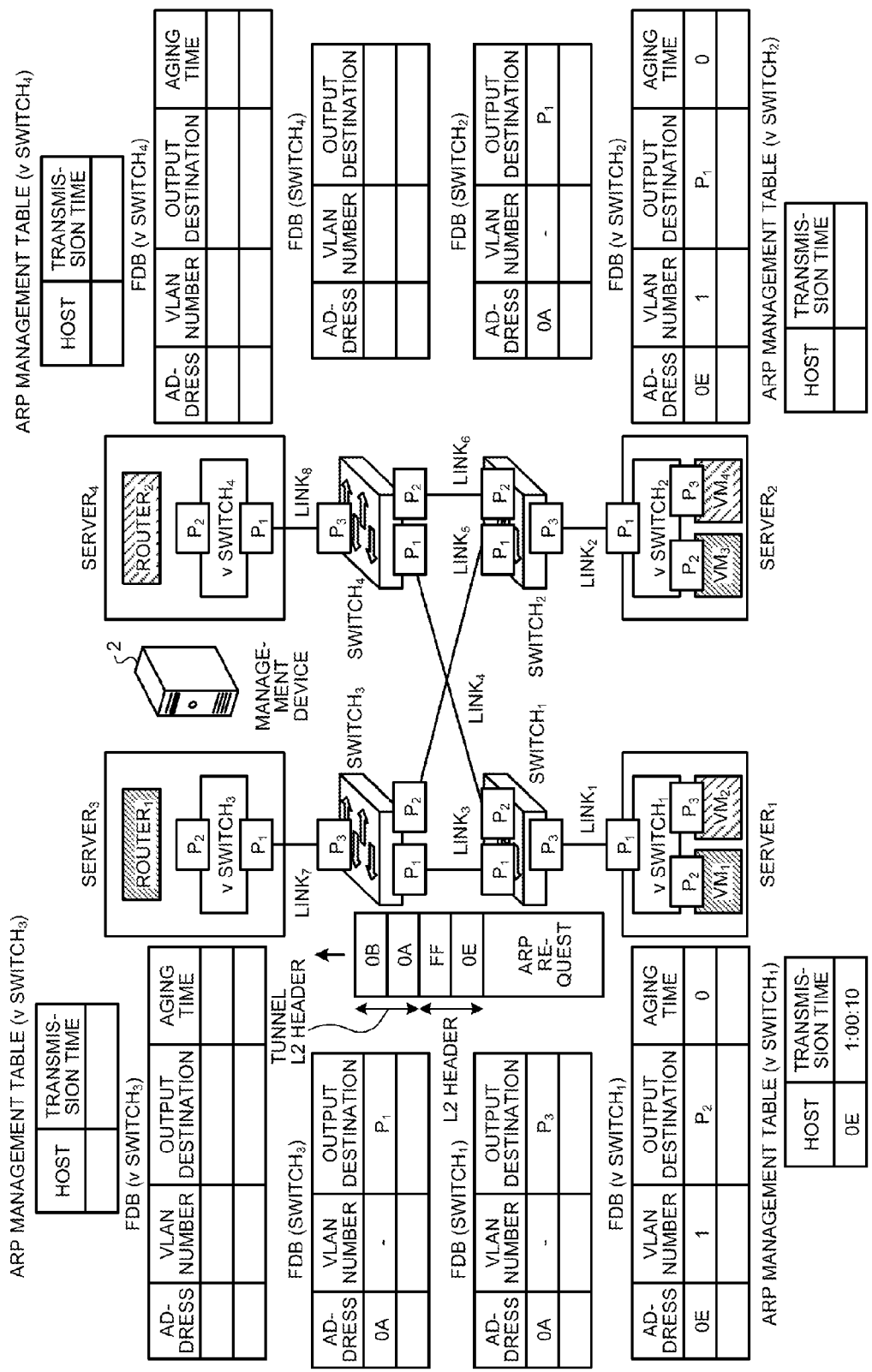
FIG. 20 is a schematic diagram illustrating the state when the communication of $VM_1 \rightarrow VM_3$ (ARP request transmission) is started at [time 1:00:10]

FIG. 20 is a schematic diagram illustrating the state when the communication of VM$_1$→VM$_3$ (ARP request transmission) is started at [time 1:00:10]. In FIG. 20, a tunnel L2 header is the header that is used for the tunnel and an L2 header is the header that is used for the VLAN. As illustrated in FIG. 20, in order for the VM$_1$ to acquire the MAC address of the VM$_3$, the VM$_1$ sends an ARP request packet as broadcast to P$_2$ of the v switch$_1$. Then, the v switch$_1$ registers MAC address "0E" of the VM$_1$ and the current time "1:00:10" in the host and the transmission time, respectively, in the ARP management table 55. The v switch$_1$ registers the MAC address "0E" of the VM$_1$, "1", P$_2$, and "0" in the address, the VLAN number, the output destination, and the aging time, respectively, in the FDB.

Then, the v switch$_1$ sends the ARP request packet toward the server$_2$ by using the tunnel$_2$. In other words, the v switch$_1$ sends the ARP request packet to P$_3$ of the switch$_1$ and the switch$_1$ registers the MAC address "0A" of the server$_1$ and P$_3$ in the address and the output destination, respectively, in the FDB. Thereafter, when the switch$_1$ sends the ARP request packet to P$_1$ of the switch$_3$, the switch$_3$ registers the MAC address "0A" of the server$_1$ and P$_1$ in the address and the output destination, respectively, in the FDB.

Thereafter, when the switch$_3$ sends the ARP request packet to P$_1$ of the switch$_2$, the switch$_2$ registers the MAC address "0A" of the server$_1$ and P$_1$ in the address and the output destination, respectively, in the FDB. Thereafter, when the switch$_2$ sends the ARP request packet to P$_1$ of the v switch$_2$, the v switch$_2$ registers MAC address "0E" of the VM$_1$, "1", P$_1$, and "0" in the address, the VLAN number, the output destination, and the aging time, respectively, in the FDB.

Figure 21:
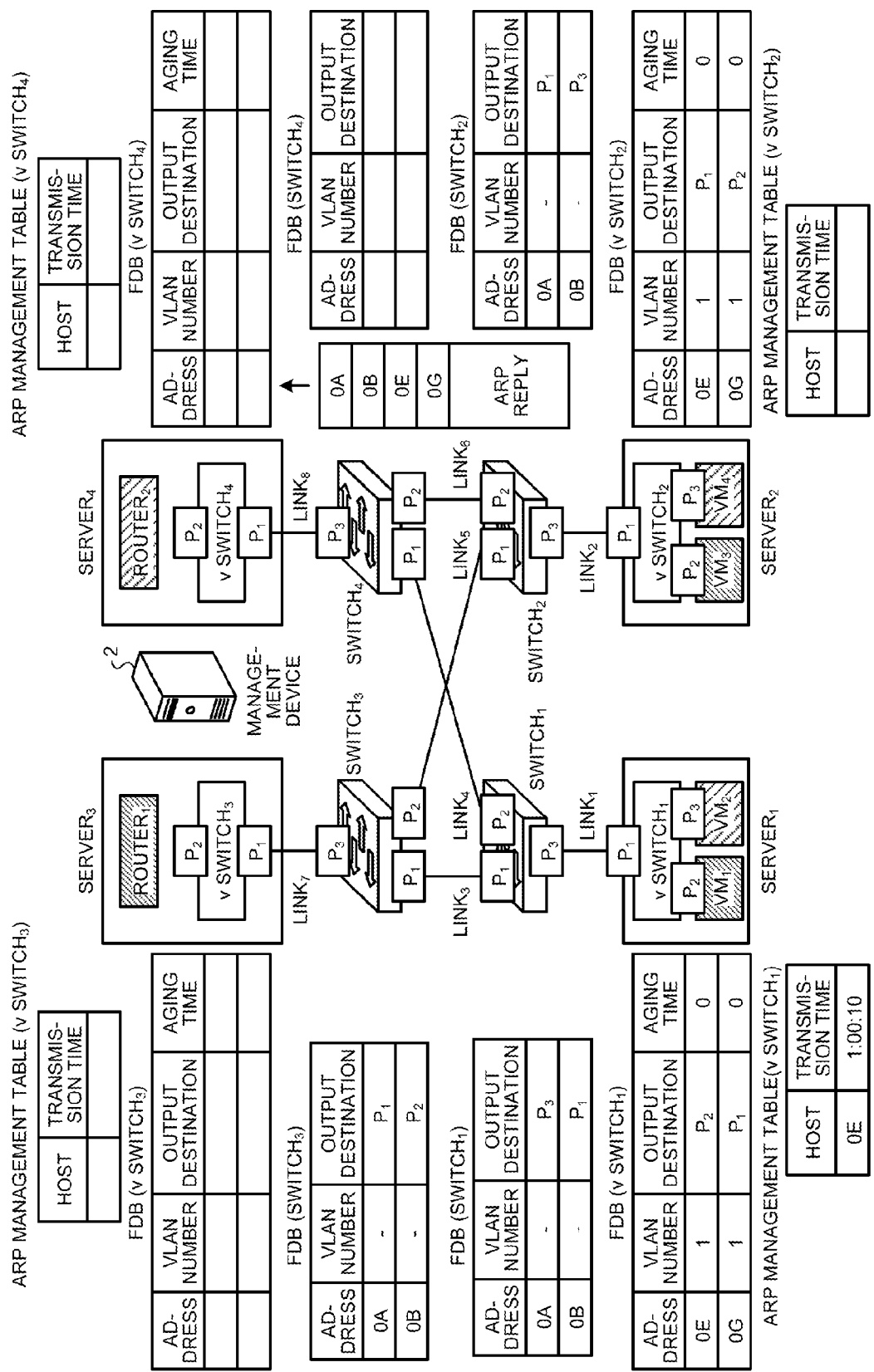
FIG. 21 is a schematic diagram illustrating the state when the communication of $VM_1 \rightarrow VM_3$ (ARP reply transmission) is started at [time 1:00:10]

FIG. 21 is a schematic diagram illustrating the state when the communication of VM$_1$→VM$_3$ (ARP reply transmission) is started at [time 1:00:10]. As illustrated in FIG. 21, the VM$_3$ sends an ARP reply to the VM$_1$ as a reply to the ARP request. Then, the v switch$_2$ registers the MAC address "0G" of the VM$_3$, "1", P$_2$, and "0" in the address, the VLAN number, the output destination, and the aging time, respectively, in the FDB. Then, the v switch$_2$ sends the ARP reply packet to P$_3$ of the switch$_2$ and then the switch$_2$ registers the MAC address "0B" of the server$_2$ and P$_3$ in the address and the output destination, respectively, in the FDB.

Thereafter, when the switch$_2$ sends the ARP reply packet to P$_2$ of the switch$_3$, the switch$_3$ registers the MAC address "0B" of the server$_1$ and P$_2$ in the address and the output destination, respectively, in the FDB. Thereafter, when the switch$_3$ sends the ARP reply packet to P$_1$ of the switch$_1$, the switch$_1$ registers the MAC address "0B" of the server$_2$ and P$_1$ in the address and the output destination, respectively, in the FDB. Thereafter, when the switch$_1$ sends the ARP reply packet to P$_1$ of the v switch$_1$, the v switch$_1$ registers the MAC address "0G" of the VM$_3$, "1", P$_1$, and "0" in the address, the VLAN number, the output destination, and the aging time, respectively, in the FDB.

Figure 22:
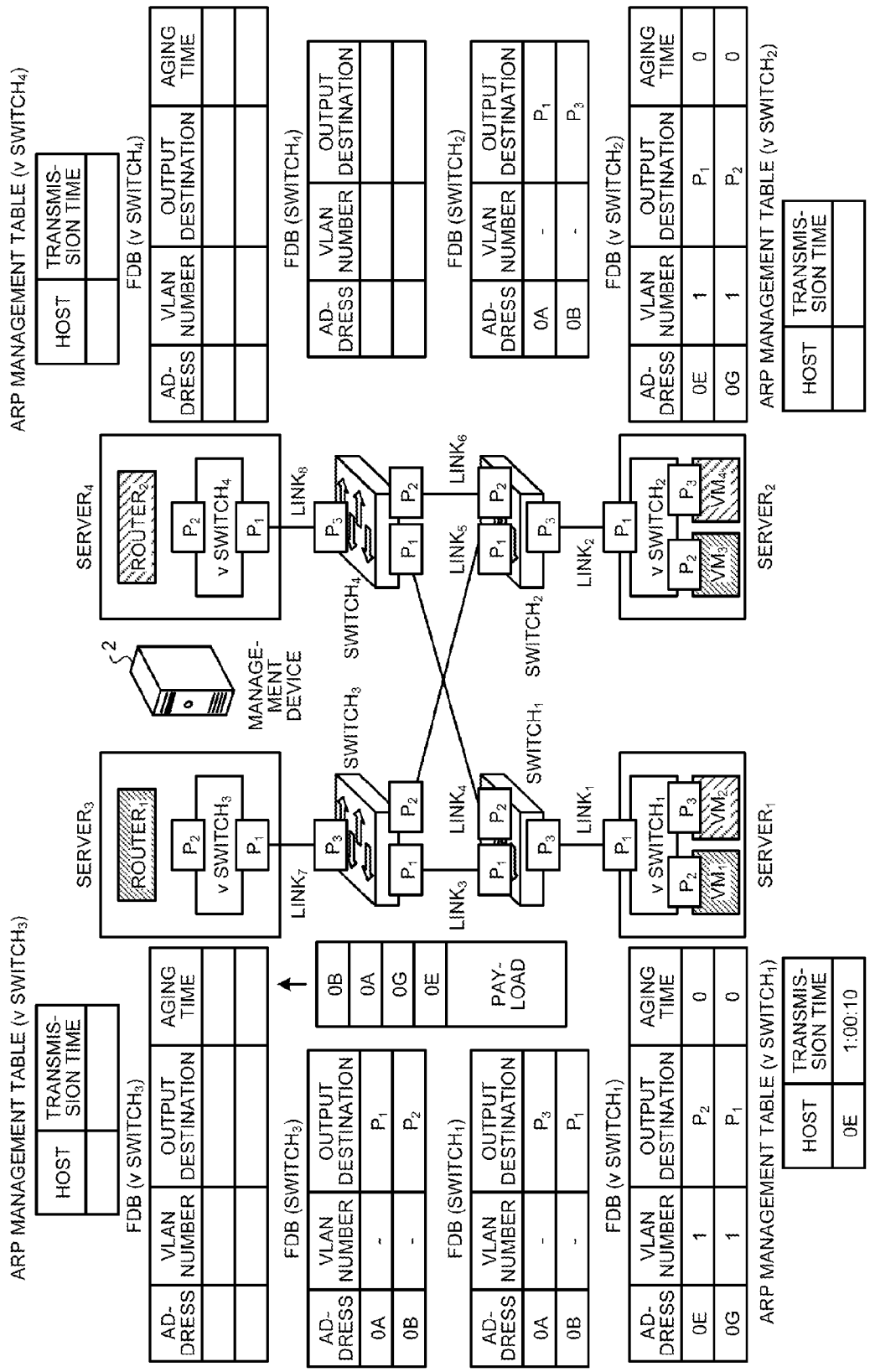
FIG. 22 is a schematic diagram illustrating the state when the communication of $VM_1 \rightarrow VM_3$ (data transmission) is started at [time 1:00:10]

FIG. 22 is a schematic diagram illustrating the state when the communication of VM$_1$→VM$_3$ (data transmission) is started at [time 1:00:10]. As illustrated in FIG. 22, the v switch$_1$ and the v switch$_2$ reset the value of the aging time in the FDB to "0" every time data passes.

Figure 23:
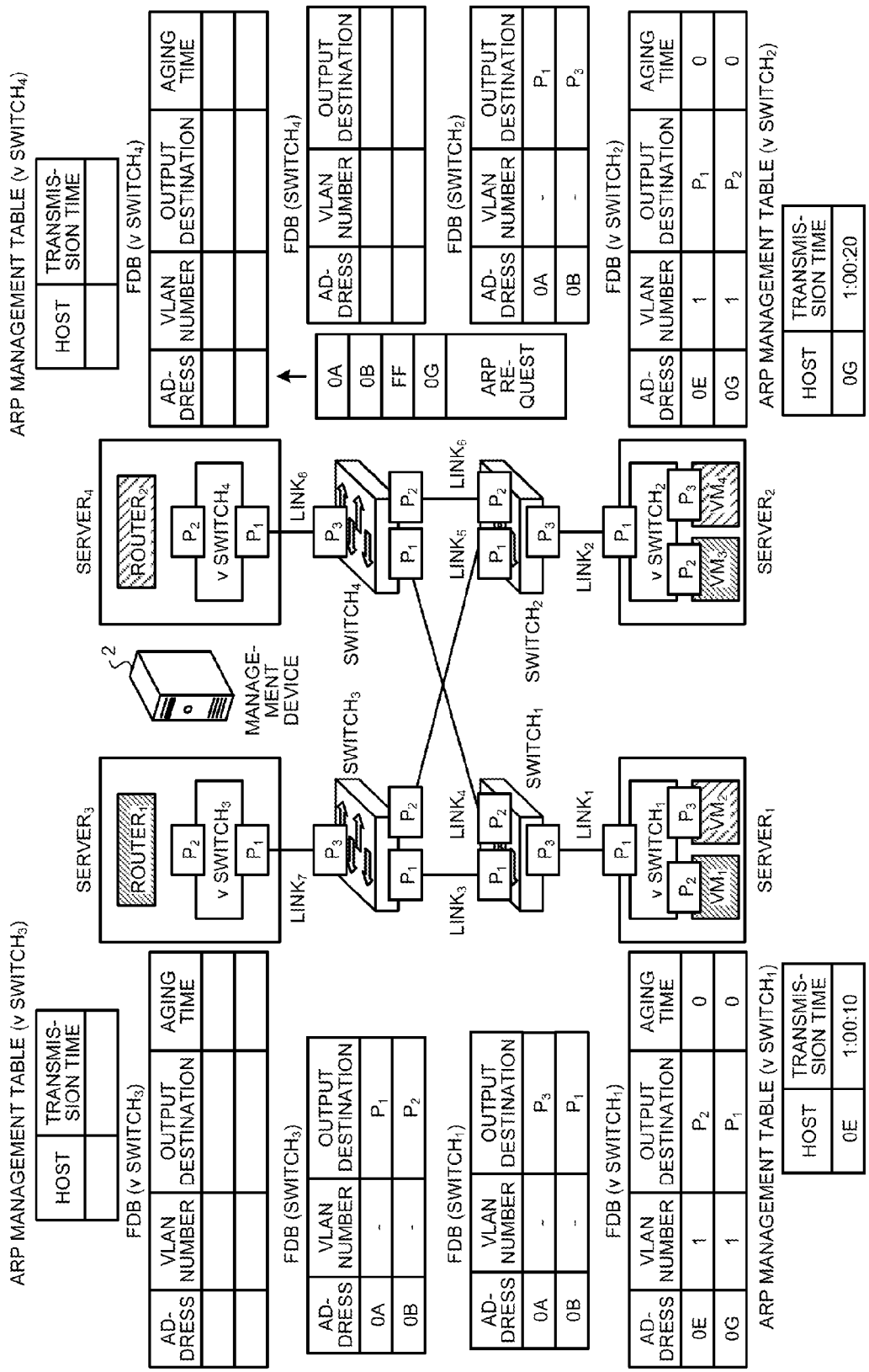
FIG. 23 is a schematic diagram illustrating the state when the communication of $VM_3 \rightarrow VM_1$ (ARP request transmission) is started at [time 1:00:20]

FIG. 23 is a schematic diagram illustrating the state when the communication of VM$_3$→VM$_1$ (ARP request transmission) is started at [time 1:00:20]. As illustrated in FIG. 23, in order for the VM$_3$ to acquire the MAC address of the VM$_1$, the VM$_3$ sends an ARP request packet to P$_2$ of the v switch$_2$ as broadcast. Then, the v switch$_2$ registers MAC address "0G" of the VM$_1$ and the current time "1:00:20" in the host and the transmission time, respectively, in the ARP management table 55. However, because the information on the VM$_3$ has already been registered in the FDB, the v switch$_2$ does not update the FDB.

Then, the v switch$_2$ sends the ARP request packet toward the server$_1$ by using the tunnel$_2$. However, because the information on the server$_2$ has already been registered in the FDB in each of the switch$_2$, the switch$_3$, and the switch$_1$, each of the switch$_2$, the switch$_3$, and the switch$_1$ does not update the FDB. Furthermore, because the information on the VM$_3$ has already been registered in the FDB in the v switch$_1$, the v switch$_1$ does not update the FDB.

Figure 24:
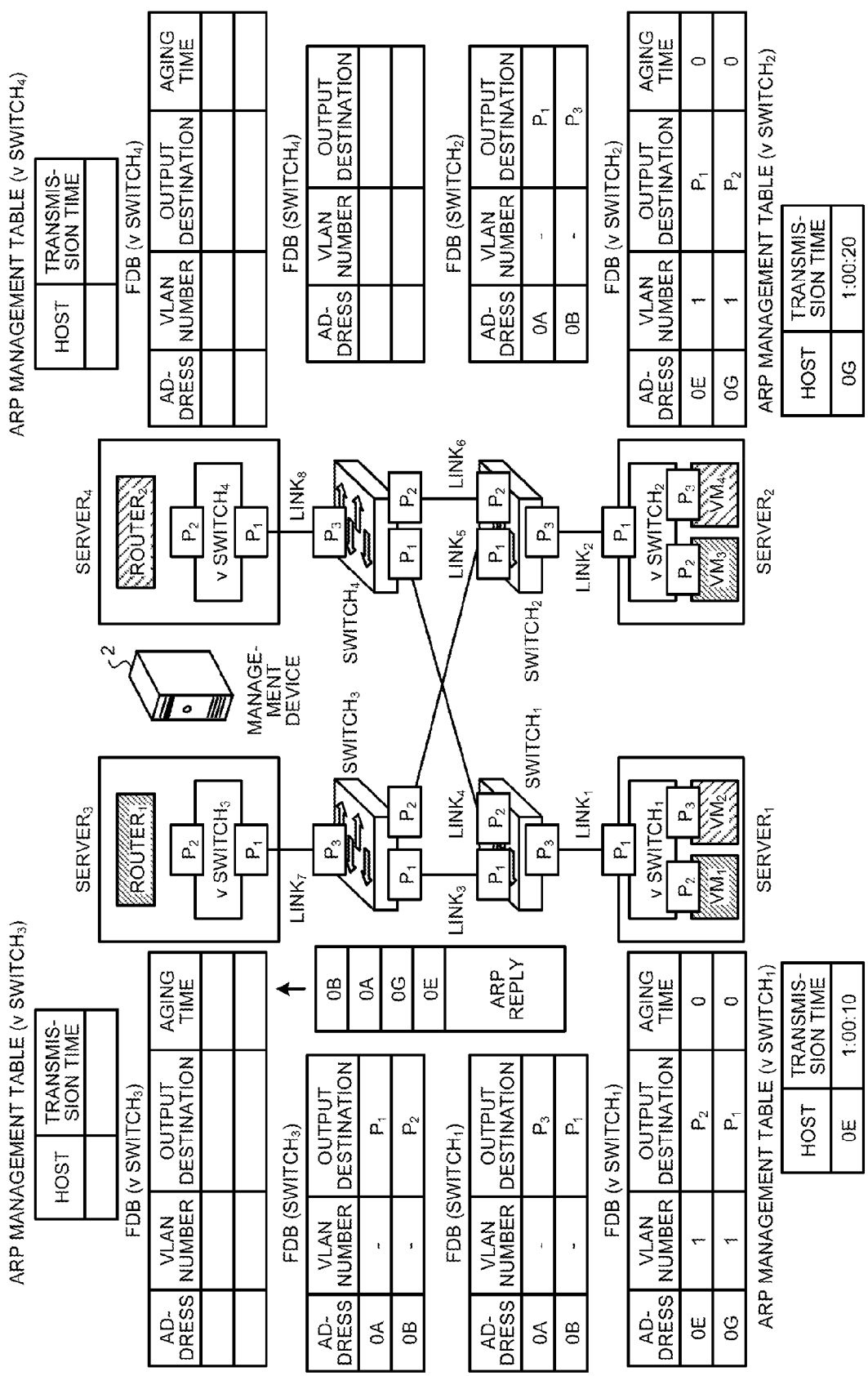
FIG. 24 is a schematic diagram illustrating the state when the communication of $VM_3 \rightarrow VM_1$ (ARP reply transmission) is started at [time 1:00:20]

FIG. 24 is a schematic diagram illustrating the state when the communication of VM$_3$→VM$_1$ (ARP reply transmission) is started at [time 1:00:20]. As illustrated in FIG. 24, the VM$_1$ sends an ARP reply to the VM$_3$ as a reply to the ARP request. However, because the information on the VM$_1$ has already been registered in the FDB in the v switch$_1$, the v switch$_1$ does not update the FDB.

Then, the v switch$_1$ sends an ARP reply packet toward the server$_2$ by using the tunnel$_2$. However, because the information on the server$_1$ has already been in the FDB in each of the switch$_1$, the switch$_3$, and the switch$_2$, each of the switch$_1$, the switch$_3$, and the switch$_2$ does not update the FDB. Furthermore, because the information on the VM$_1$ has already been registered in the FDB in the v switch$_2$, the v switch$_2$ does not update the FDB.

Figure 25:
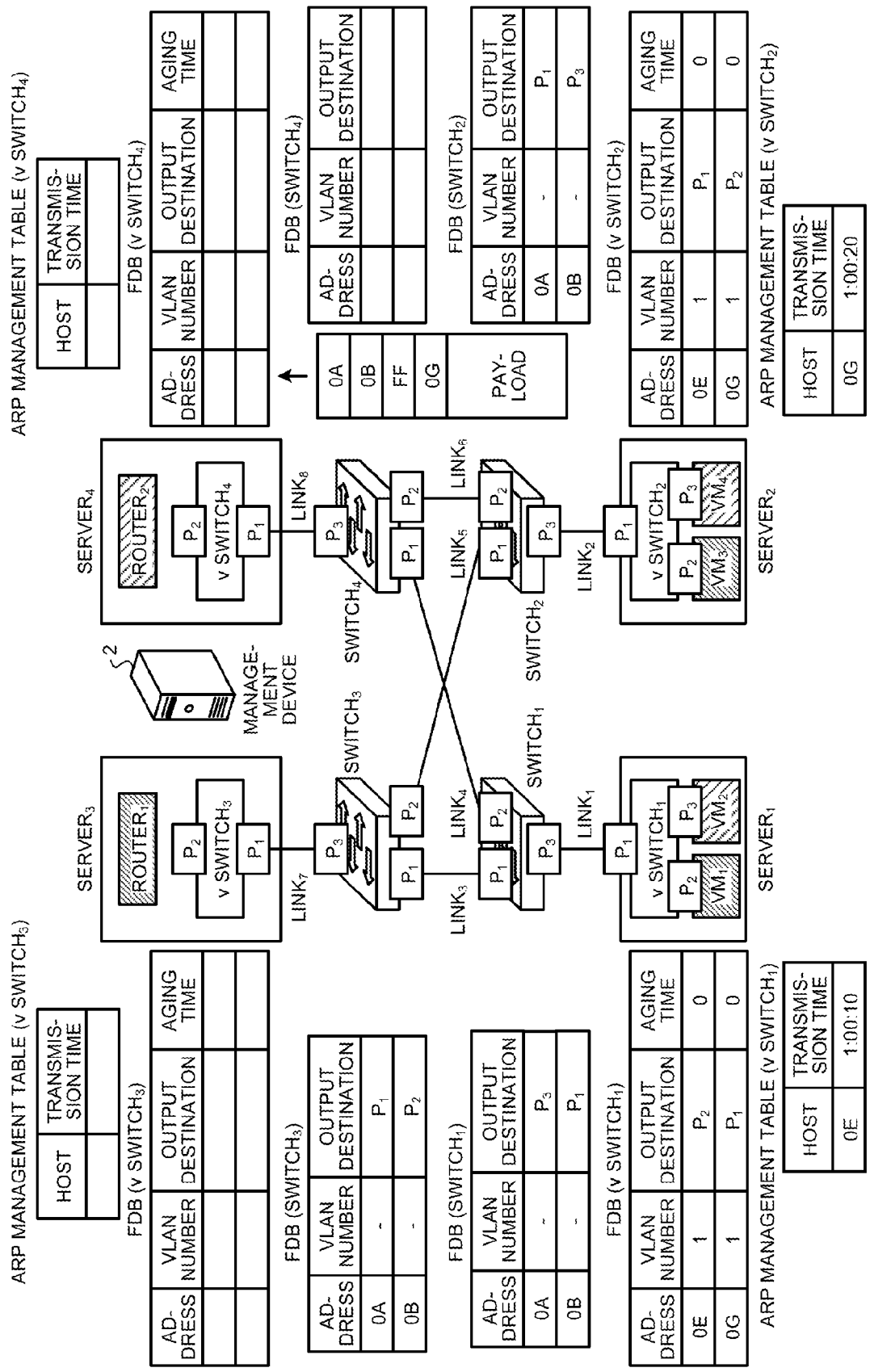
FIG. 25 is a schematic diagram illustrating the state when the communication of $VM_3 \rightarrow VM_1$ (data transmission) is started at [time 1:00:20]

FIG. 25 is a schematic diagram illustrating the state when the communication of VM$_3$→VM$_1$ (data transmission) is started at [time 1:00:20]. As illustrated in FIG. 25, the v switch$_1$ and the v switch$_2$ reset the value of the aging time in the FDB to "0" every time data passes.

Figure 26:
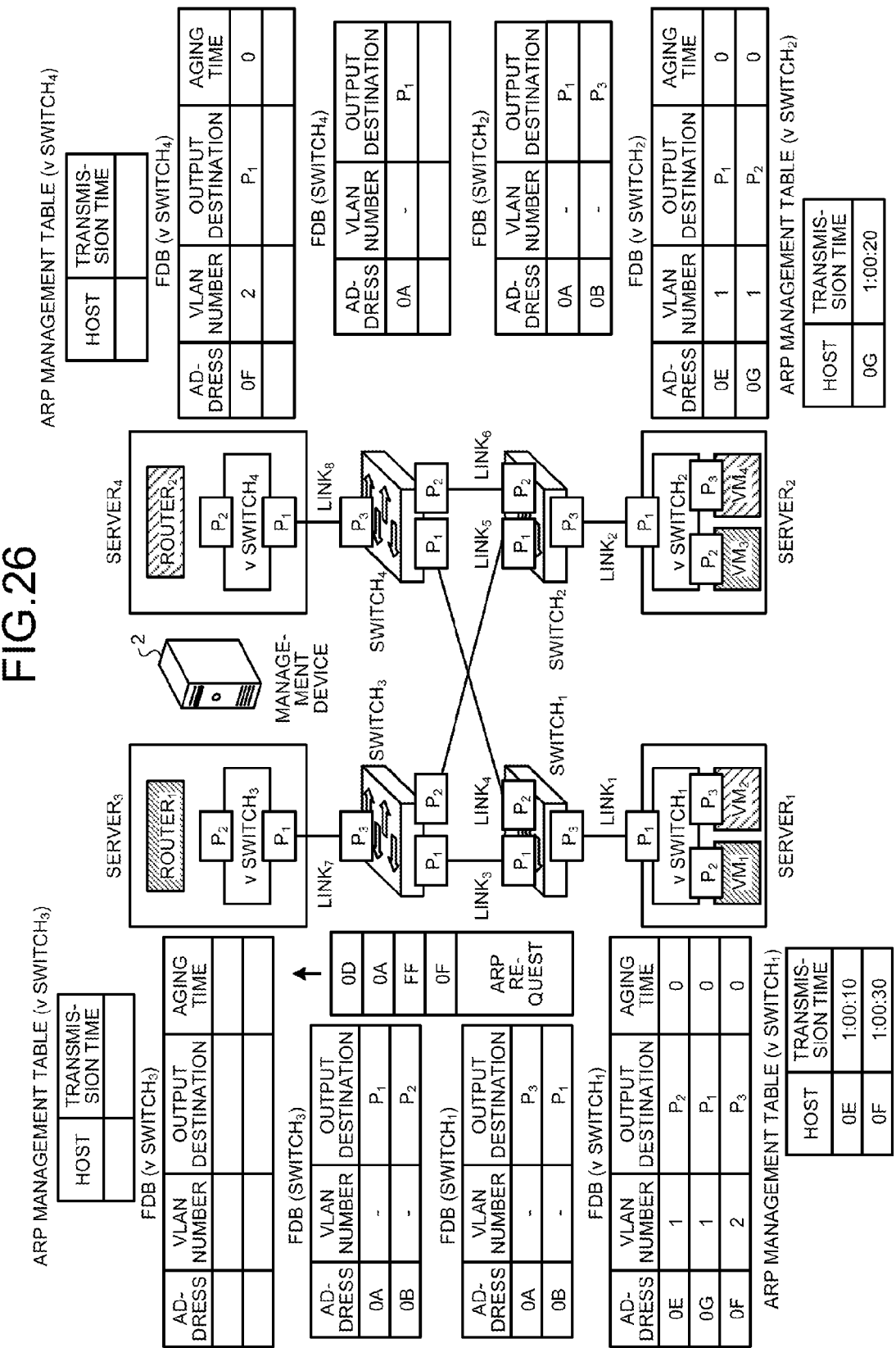
FIG. 26 is a schematic diagram illustrating the state when the communication of $VM_2 \rightarrow router_2$ (ARP request transmission) is started at [time 1:00:30]

FIG. 26 is a schematic diagram illustrating the state when the communication of VM$_2$→router$_2$ (ARP request transmission) is started at [time 1:00:30]. As illustrated in FIG. 26, in order for the VM$_2$ to acquire the MAC address of the router$_2$, the VM$_2$ sends the ARP request packet to P$_3$ of the v switch$_1$ as broadcast. Then, the v switch$_1$ registers MAC address "0F" of the VM$_2$ and the current time "1:00:30" in the host and the transmission time, respectively, in the ARP management table 55. Furthermore, the v switch$_1$ registers the MAC address "0F" of the VM$_2$, "2", P$_3$, and "0" in the address, the VLAN number, and the output destination, and the aging time, respectively, in the FDB.

Then, the v switch$_1$ sends the ARP request packet toward the server$_4$ by using the tunnel$_3$. Namely, the v switch$_1$ sends the ARP request packet to P$_3$ of the switch$_1$. However, because the information on the server$_1$ has already been registered in the FDB in the switch$_1$, the switch$_1$ does not update the FDB. When the switch$_1$ sends the ARP request packet to P$_1$ of the switch$_4$, the switch$_4$ registers the MAC address "0A" and P$_1$ of the server$_1$ in the address and the output destination, respectively, in the FDB.

Thereafter, when the switch$_4$ sends the ARP request packet to P$_1$ of the v switch$_4$, the v switch$_4$ registers MAC address "0F" of the VM$_3$, "2", P$_1$, and "0" in the address, the VLAN number, the output destination, and the aging time, respectively, in the FDB.

Figure 27:
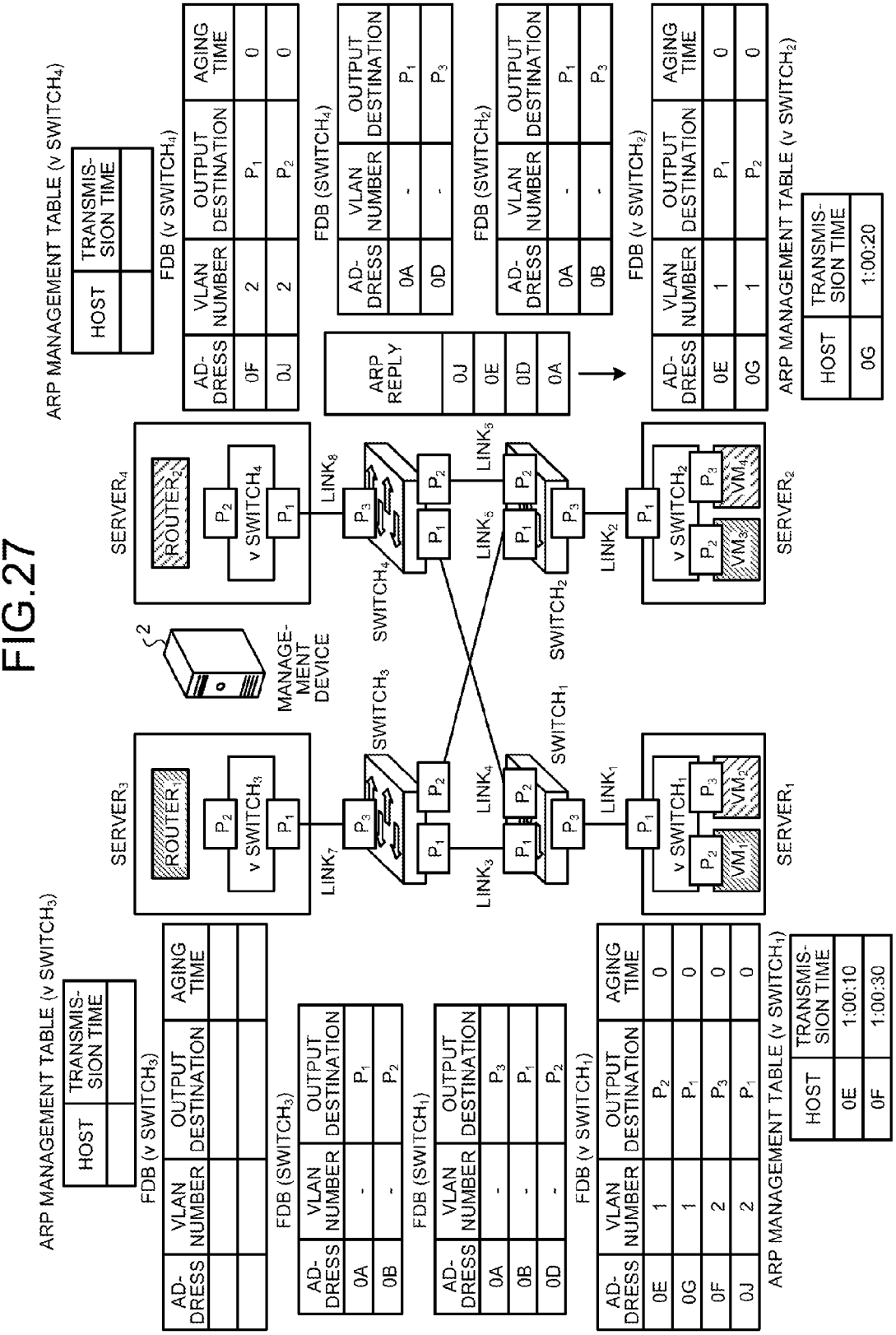
FIG. 27 is a schematic diagram illustrating the state when the communication of $VM_2 \rightarrow router_2$ (ARP reply transmission) is started at [time 1:00:30]

FIG. 27 is a schematic diagram illustrating the state when the communication of VM$_2$→router$_2$ (ARP reply transmission) is started at [time 1:00:30]. As illustrated in FIG. 27, the router$_2$ sends an ARP reply as a reply to the ARP request to the VM$_2$. Then, the v switch$_4$ registers the MAC address "0J" of the router$_2$, "2", P$_2$ and "0" in the address, the VLAN number, the output destination, and the aging time, respectively, in the FDB.

Then, the v switch$_4$ sends the ARP reply toward the server$_1$ by using the tunnel$_3$. Namely, the v switch$_4$ sends the ARP reply packet to P$_3$ of the switch$_4$ and then the switch$_4$ registers the MAC address "0D" of the server$_4$ and P$_3$ in the address and the output destination, respectively, in the FDB. Thereafter, when the switch$_4$ sends the ARP reply packet to P$_2$ of the switch$_1$, the switch$_1$ registers the MAC address "0D" of the server$_4$ and P$_2$ in the address and the output destination, respectively, in the FDB. Thereafter, when the switch$_1$ sends the ARP reply packet to P$_1$ of the v switch$_1$, the v switch$_1$ registers the MAC address "0J" of the router$_2$, "2", P$_1$, and "0" in the address, the VLAN number, the output destination, and the aging time, respectively, in the FDB.

Figure 28:
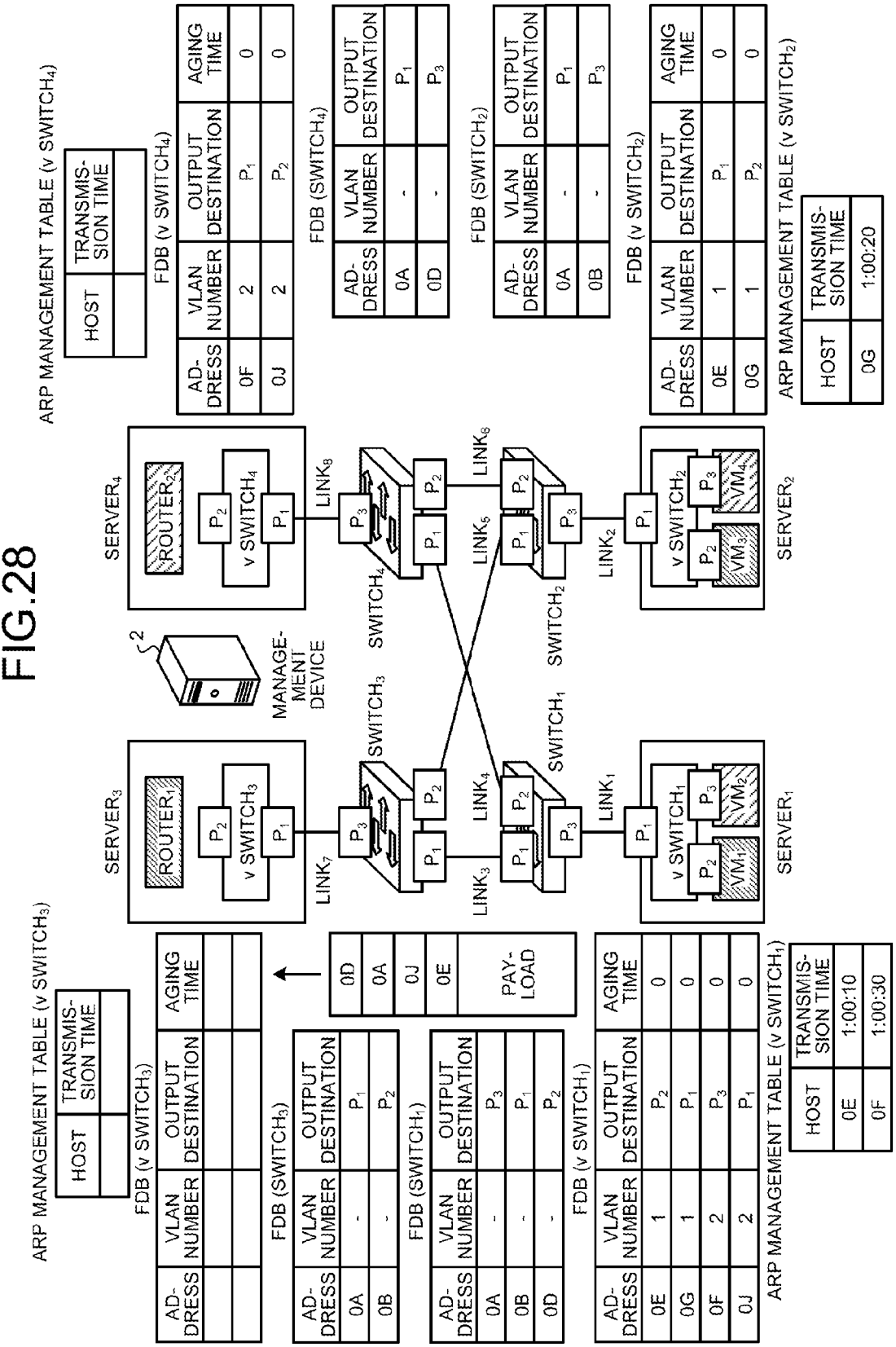
FIG. 28 is a schematic diagram illustrating the state when the communication of $VM_2 \rightarrow router_2$ (data transmission is started at [time 1:00:30]

FIG. 28 is a schematic diagram illustrating the state when the communication of VM$_2$→router$_2$ (data transmission is started at [time 1:00:30]. As illustrated in FIG. 28, the v switch$_1$ and the v switch$_4$ r reset the value of the aging time in the FDB to "0" every time data passes.

Figure 29:
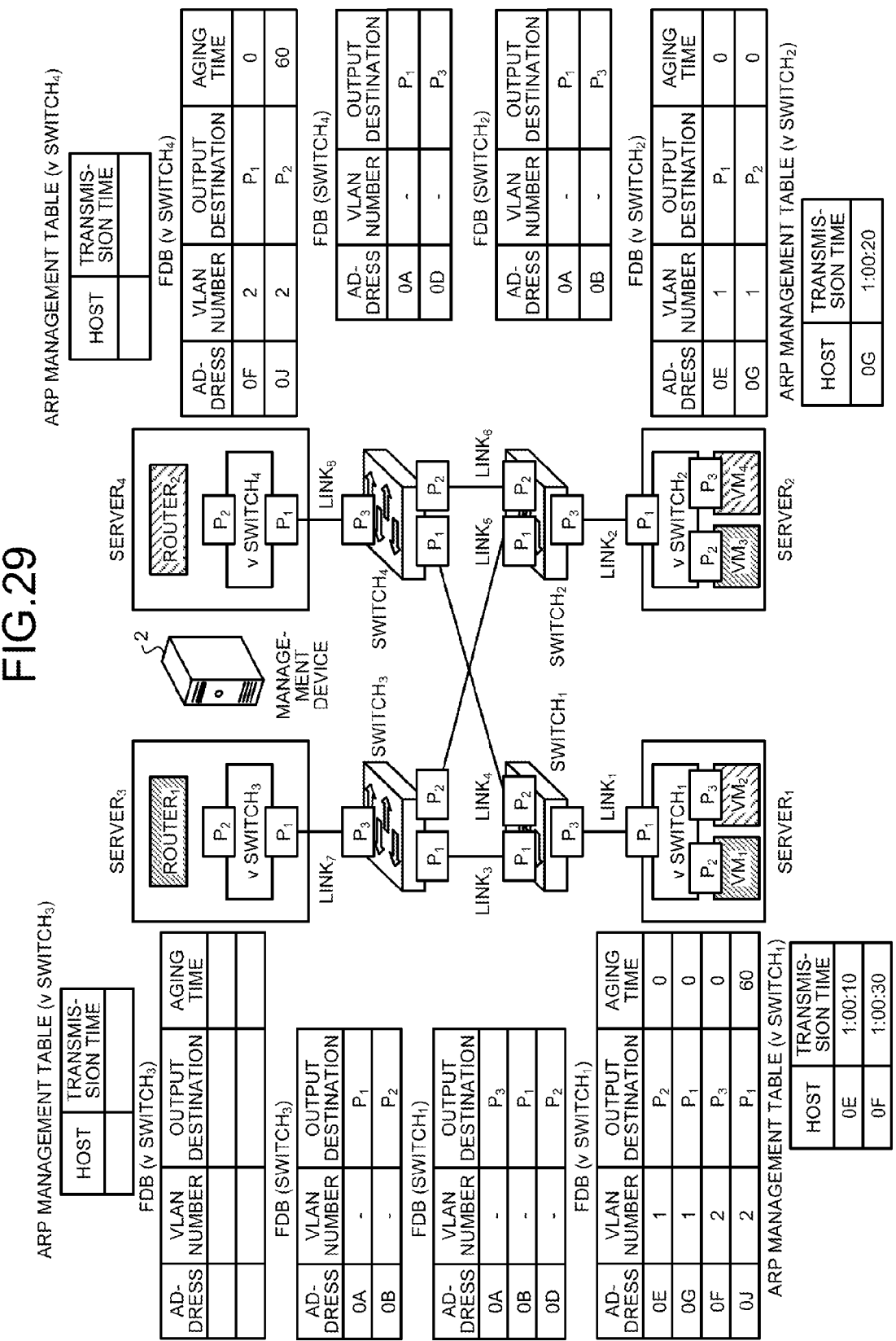
FIG. 29 is a schematic diagram illustrating the state when the communication of $VM_2 \rightarrow router_2$ is ended at [time 1:01:30]

FIG. 29 is a schematic diagram illustrating the state when the communication of VM$_2$→router$_2$ is ended at [time 1:01:30]. As illustrated in FIG. 29, in the FDB in each of the v switch$_1$ and the v switch$_4$, because 60 seconds has elapsed since data was transmitted to the router$_2$, the aging time of the entry associated with the router$_2$ indicates "60".

Figure 30:
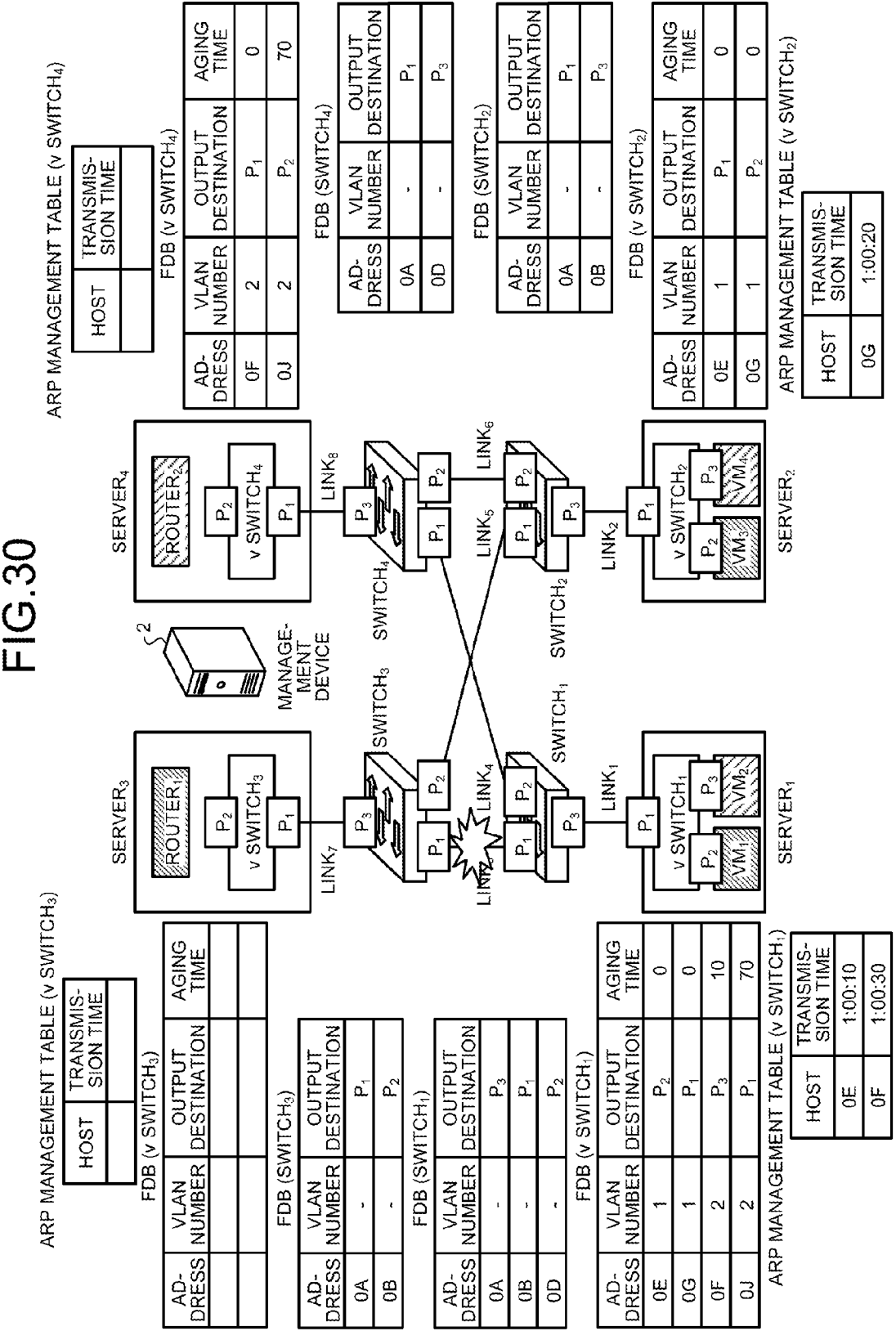
FIG. 30 is a schematic diagram illustrating the state when a failure occurs in a $link_3$ at [time 1:01:40]

FIG. 30 is a schematic diagram illustrating the state when a failure occurs in a link$_3$ at [time 1:01:40]. As illustrated in FIG. 30, in the FDB in each of the v switch$_1$ and the v switch$_4$, because 70 seconds has elapsed since data was transmitted to the router$_2$, the aging time of the entry associated with the router$_2$ indicates "70". Furthermore, in the FDB in the v switch$_1$, because 10 seconds has elapsed since data was transmitted to the VM$_2$, the aging time of the entry associated with the VM$_2$ indicates "10".

Because a failure has occurred in the link$_3$, the effect range identifying unit 26 refers to the FDBs in the switch$_1$ and the switch$_3$ that are the nodes at both ends of the link$_3$ and then extracts an entry that corresponds to the output destination of the failure link. FIG. 31 is a schematic diagram illustrating the result of extracting entries in each of which the output destination corresponds to the failure link. As illustrated in FIG. 31, the server$_2$ with the MAC address "0B" is extracted from the FDB stored in the switch$_1$ as the entry indicating the output port P$_1$ to the link$_3$. Furthermore, the server$_1$ with the MAC address of "0A" is extracted from the FDB in the switch$_3$ as the entry indicating the output port P$_1$ of the link$_3$.

Then, the effect range identifying unit 26 refers to, at time "1:01:42", the FDB in each of the v switch$_1$ and the v switch$_2$ in the server$_1$ and the server$_2$, respectively. Then, because the current time "1:01:42" minus the failure occurrence time "1:01:40" is 2 seconds, the effect range identifying unit 26 extracts the entries in which the aging time is equal to or less than 2 seconds.

FIG. 32 is a schematic diagram illustrating the result of extracting entries in each of which the aging time is equal to or less than 2 seconds. As illustrated in FIG. 32, VM$_1$ with the MAC address of "0E" and the VM$_3$ with the MAC address of "0G" are extracted, from the FDB stored in the v switch$_1$, as the entries in which the aging time is equal to or less than 2 seconds. Furthermore, the VM$_1$ with the MAC address or "0E" and the VM$_3$ with the MAC address of "0G" are also extracted, from the FDB stored in the v switch$_2$, as the entries in which the aging time is equal to or less than 2 seconds.

Then, the effect range identifying unit 26 refers to the ARP management table 55 by using the MAC addresses of the extracted virtual machines and extracts a virtual machine in which the failure occurrence time is greater than the transmission time. FIG. 33 is a schematic diagram illustrating the result of extracting virtual machines in each of which the failure occurrence time is greater than the transmission time. As illustrated in FIG. 33, the VM$_1$ and the VM$_3$ are extracted from the ARP management table 55 in the v switch$_1$, as the virtual machine in which the failure occurrence time is greater than the transmission time. Furthermore, the VM$_1$ and the VM$_3$ are also extracted, from the ARP management table 55 in the v switch$_2$, as the virtual machine in which the failure occurrence time is greater than the transmission time.

Then, the effect range identifying unit 26 identifies, from the VM allocation information, the tenant affected by a failure, i.e., a failure affected tenant. FIG. 34 is a schematic diagram illustrating the result of identifying a failure affected tenant. As illustrated in FIG. 34, because the tenant to which the virtual machines VM$_1$ and VM$_3$ belong is the tenant A, the tenant A is identified as a failure affected tenant.

Then, the effect range identifying unit 26 identifies, from the tunnel information, the tunnel and the passing route affected by the failure. FIG. 35 is a schematic diagram illustrating the result of identifying the tunnel and the passing route. As illustrated in FIG. 35, because the communication between the server$_1$ and the server$_2$ is performed using the tunnel$_2$ the tunnel$_2$ and the passing route "the link$_1$"-"the link$_3$"-"the link$_5$"-"the link$_2$" are identified. Because the link$_3$ in which the failure has occurred is included in this passing route, it is determined that the tunnel$_2$ and the passing route "the link$_1$"-"the link$_3$"-"the link$_5$"-"the link$_2$" are affected.

As described above, in the embodiment, the effect range identifying unit 26 refers to the FDB stored in each of the nodes at both ends of the failure link, identifies the servers that were in communication, and identifies the virtual machines that were in communication in the identified servers by referring to the FDB stored in the virtual switch. However, the effect range identifying unit 26 excludes the virtual machine in which the aging time is greater than the elapsed time after the failure has occurred from the virtual machines that were in communication. Furthermore, the effect range identifying unit 26 refers to the ARP management table 55 and excludes the virtual machine in which the failure occurrence time is not greater than the transmission time from the virtual machines that were in communication. Consequently, the effect range identifying unit 26 can accurately identify the virtual machine that is in communication and can accurately identify the tenant and the communication path that are affected by the failure.

Furthermore, in the embodiment, a description has been given of the management device; however, it is possible to obtain a control program having the same function as that performed by the management device by implementing the configuration of the management device by using software. Accordingly, a computer that executes a control program for the management device will be described.

Figure 36:
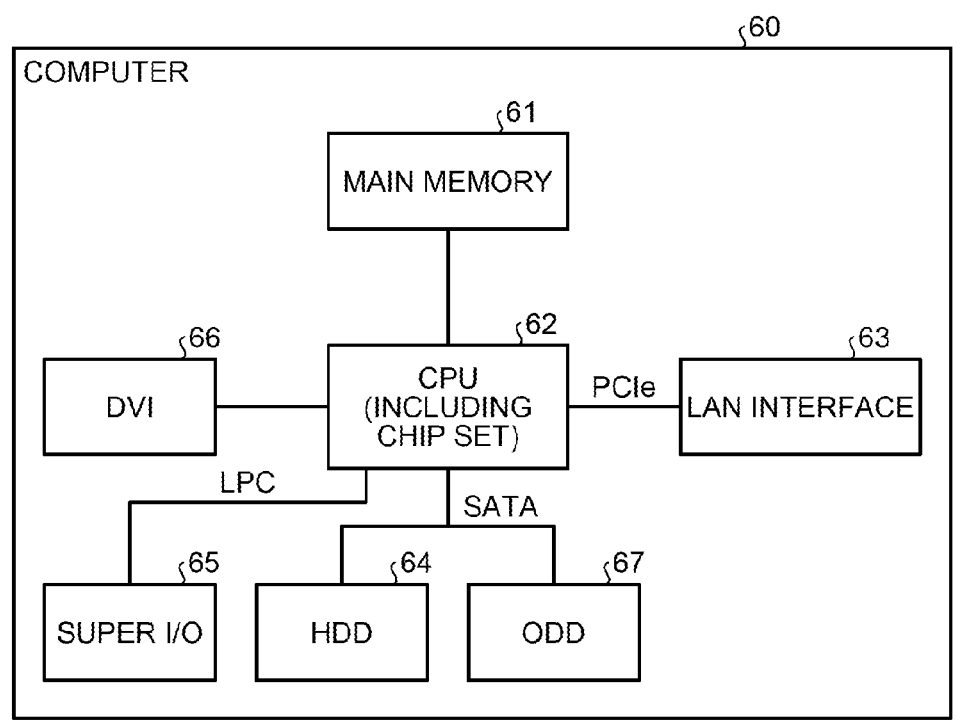
FIG. 36 is a schematic diagram illustrating the hardware configuration of a computer that executes a control program for the management device according to the embodiment.

FIG. 36 is a schematic diagram illustrating the hardware configuration of a computer that executes a control program for the management device according to the embodiment. As illustrated in FIG. 36, a computer 60 includes a main memory 61, a central processing unit (CPU) 62, a local area network (LAN) interface 63, and a hard disk drive (HDD) 64. Furthermore, the computer 60 includes a super input/output (I/O) 65, a digital visual interface (DVI) 66, and an optical disk drive (ODD) 67.

The main memory 61 is a memory that stores therein a program or the mid-result of a running program. The CPU 62 is a central processing unit that reads a program from the main memory 61. The CPU 62 includes a chip set that includes a memory controller.

The LAN interface 63 is an interface for connecting the computer 60 to another computer via a LAN. The HDD 64 a disk device that stores therein a program or data. The super I/O 65 is an interface for connecting an input device, such as a mouse or a keyboard. The DVI 66 is an interface for connecting a liquid crystal display device. The ODD 67 is a device that reads and writes a DVD.

The LAN interface 63 is connected to the CPU 62 by a PCI express. The HDD 64 and the ODD 67 are connected to the CPU 62 by a serial advanced technology attachment (SATA). The super I/O 65 is connected to the CPU 62 by a low pin count (LPC).

Then, the control program for the management device executed by the computer 60 is stored in the DVD, is read by the ODD 67 from the DVD, and is installed in the computer 60. Alternatively, the control program for the management device is stored in a database or the like in another computer system that is connected via the LAN interface 63, is read from the database, and is installed in the computer 60. Then, the installed control program for the management device is stored in the HDD 64, is read in the main memory 61, and is executed by the CPU 62.

According to an aspect of an embodiment, an advantage is provided in that, when an effect range of a failure is identified, it is possible to minimize the number of tenants affected by the failure by accurately identifying a failure path.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. An information processing system comprising:
   a first information processing apparatus that executes a first virtual machine belonging to a first tenant and that executes a second virtual machine belonging to a second tenant;
   a second information processing apparatus that executes a third virtual machine belonging to the first tenant and that executes a fourth virtual machine belonging to the second tenant;
   a first switch device that is connected to the first information processing apparatus;
   a second switch device that is connected to the second information processing apparatus;
   a third switch device that is connected to the first switch device and the second switch device;
   a fourth switch device that is connected to the first switch device and the second switch device; and
   a management device that manages the first and the second information processing apparatuses and the first to the fourth switch devices, wherein
   the management device includes
      an elapsed time referring unit that refers to elapsed time information related to each sending source address that is held by one of the first to the fourth switch devices,
      a transmission time referring unit that refers to transmission time information related to each sending source address that is held by a virtual switch that is executed by one of the first and the second information processing apparatuses, and
      an identifying unit that identifies a failure path by identifying a virtual machine communicating with another virtual machine based on the elapsed time information referred to by the elapsed time referring unit and based on the transmission time information referred to by the transmission time referring unit.

2. The information processing system according to claim 1, wherein
   the virtual switch communicates between the first virtual machine and the second virtual machine by using a tunnel through which encapsulated data using information on the first and the second information processing apparatuses is sent and received, and
   the management device further includes
      a switch information acquiring unit that acquires, from switch devices at both ends of a link in which the failure has occurred, physical forwarding information that indicates an association relation between an output port of one of the switch devices and the information processing apparatus that corresponds to a destination of the data,
      a virtual switch information acquiring unit that acquires, from virtual switches at both ends of the link in which the failure has occurred, virtual forwarding information that indicates association relation between an output port of one of the virtual switches and the virtual machine that corresponds to the destination of the data, and
      an allocation information storing unit that stores therein allocation information that indicates the association relation between the virtual machines and the tenants, and
   the identifying unit identifies, based on the elapsed time information, the transmission time information, the physical forwarding information, the virtual forwarding information, and the allocation information, the failure path and the tenant affected by the failure.

3. The information processing system according to claim 2, wherein, when a period of time from failure occurrence time to the current time is smaller than that indicated by the elapsed time information, the identifying unit excludes a path that is used for the communication by the virtual machine associated with the elapsed time information from the failure path.

4. The information processing system according to claim 2, wherein, when transmission start time indicated by the transmission time information is equal to or greater than failure occurrence time, the identifying unit excludes a path that is used for the communication by the virtual machine associated with the transmission time information from the failure path.

5. The information processing system according to claim 2, wherein
the management device further includes a route information storing unit that stores therein path information that indicates the association relation between a communication path and a combination of information processing apparatuses that communicate with each other, and
the identifying unit identifies the combination of the information processing apparatuses that communicate using the failure path, identifies the communication path associated with the identified combination from the route information storing unit, determines whether the failure occurrence link is included in the identified communication path, and determines, when the failure occurrence link is included in the identified communication path, that the failure path is affected by the failure.

6. A control method for an information processing system that includes a first information processing apparatus that executes a first virtual machine belonging to a first tenant and that executes a second virtual machine belonging to a second tenant, a second information processing apparatus that executes a third virtual machine belonging to the first tenant and that executes a fourth virtual machine belonging to the second tenant, a first switch device that is connected to the first information processing apparatus, a second switch device that is connected to the second information processing apparatus, a third switch device that is connected to the first switch device and the second switch device, a fourth switch device that is connected to the first switch device and the second switch device, and a management device that manages the first and the second information processing apparatuses and the first to the fourth switch devices, the control method for the information processing system comprising:
referring to, performed by the management device, elapsed time information related to each sending source address that is held by one of the first to the fourth switch devices;
referring to, performed by the management device, transmission time information related to each sending source address that is held by a virtual switch that is executed by one of the first and the second information processing apparatuses; and
identifying, performed by the management device, a failure path by identifying a virtual machine communicating with another virtual machine based on the elapsed time information and the transmission time information.

7. A non-transitory computer-readable storing medium having stored therein a control program for a management device that manages an information processing system that includes a first information processing apparatus that executes a first virtual machine belonging to a first tenant and that executes a second virtual machine belonging to a second tenant, a second information processing apparatus that executes a third virtual machine belonging to the first tenant and that executes a fourth virtual machine belonging to the second tenant, a first switch device that is connected to the first information processing apparatus, a second switch device that is connected to the second information processing apparatus, a third switch device that is connected to the first switch device and the second switch device, a fourth switch device that is connected to the first switch device and the second switch device and the management device, the control program causing the management device to execute a process comprising:
referring to elapsed time information related to each sending source address that is held by one of the first to the fourth switch devices;
referring to transmission time information related to each sending source address that is held by a virtual switch that is executed by one of the first and the second information processing apparatuses; and
identifying a failure path by identifying a virtual machine communicating with another virtual machine based on the elapsed time information and the transmission time information.

* * * * *